United States Patent
Todd et al.

(10) Patent No.: US 11,410,104 B2
(45) Date of Patent: Aug. 9, 2022

(54) SYSTEMS AND METHODS FOR EVENT DETECTION AND DEVICE CONTROL IN A DISTRIBUTED COMPUTING ENVIRONMENT

(71) Applicant: Walmart Apollo, LLC, Bentonville, AR (US)

(72) Inventors: Jason Todd, Lowell, AR (US); Timothy Webb, Rogers, AR (US); Jennifer McTeer, Bentonville, AR (US); Jeffrey Kathman, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 459 days.

(21) Appl. No.: 15/106,658

(22) PCT Filed: Dec. 19, 2014

(86) PCT No.: PCT/US2014/071559
§ 371 (c)(1),
(2) Date: Jun. 20, 2016

(87) PCT Pub. No.: WO2015/095738
PCT Pub. Date: Jun. 25, 2015

(65) Prior Publication Data
US 2017/0004422 A1      Jan. 5, 2017

Related U.S. Application Data

(60) Provisional application No. 61/919,034, filed on Dec. 20, 2013, provisional application No. 61/919,030, (Continued)

(51) Int. Cl.
*G06Q 10/06* (2012.01)
*G06Q 20/20* (2012.01)

(52) U.S. Cl.
CPC ......... *G06Q 10/0633* (2013.01); *G06Q 20/20* (2013.01)

(58) Field of Classification Search
CPC .... G06Q 10/00; G06Q 30/02; G06Q 10/0633; G06Q 20/20; G06Q 30/0238; G06Q 30/0268; G06Q 30/0601; G06Q 20/201
(Continued)

(56) References Cited

U.S. PATENT DOCUMENTS 7,765,291 B1  7/2010  Khan et al.
8,806,508 B2  8/2014  Ng
(Continued)

FOREIGN PATENT DOCUMENTS

AU  2019100428  6/2019
CN  104158882   11/2014
CN  111240863   6/2020

OTHER PUBLICATIONS

Schuldt et al., Automatic Generation of Reliable E-Commerce Payment Processes, Jan. 1, 2000, IEEE, Proceedings of the First International Conference on Web Information Systems Engineering, vol. 1, pp. 434-441 (Year: 2000).*

(Continued)

*Primary Examiner* — Robert D Rines
(74) *Attorney, Agent, or Firm* — Fitch, Even, Tabin & Flannery LLP

(57) ABSTRACT

Systems, methods, and computer-readable storage mediums are provided for facilitating event detection and device control in a distributed computing environment In response to receiving a request, a task flow including an execution sequence for services associated with a task is coordinated. The services are invoked in order according to the execution sequence. Rules and events associated with the services are triggered. Information is routed between rules, events, and
(Continued)

services to facilitate completion of the task. The services are maintained and customizations are administered to the services.

20 Claims, 17 Drawing Sheets

Related U.S. Application Data filed on Dec. 20, 2013, provisional application No. 61/919,036, filed on Dec. 20, 2013, provisional application No. 61/919,042, filed on Dec. 20, 2013.

(58) Field of Classification Search
USPC .............................................. 705/7.11–7.42
See application file for complete search history.

(56) References Cited

U.S. PATENT DOCUMENTS

| | | |
|---|---|---|
| 10,803,435 B2 | 10/2020 | Nelms |
| 2002/0077929 A1* | 6/2002 | Knorr ................. G06Q 10/087 705/26.81 |
| 2003/0061266 A1 | 3/2003 | Ouchi |
| 2003/0167195 A1* | 9/2003 | Fernandes ........ G06Q 10/06311 705/7.13 |
| 2004/0049427 A1* | 3/2004 | Tami ................... G06Q 20/209 705/24 |
| 2004/0059634 A1* | 3/2004 | Tami ................... G06Q 20/204 705/17 |
| 2004/0133474 A1* | 7/2004 | Tami ..................... G06Q 30/02 705/16 |
| 2005/0261969 A1 | 11/2005 | Dimmock |
| 2011/0125541 A1 | 5/2011 | Whitsitt et al. |
| 2011/0145093 A1* | 6/2011 | Paradise ............ G06Q 30/0613 705/26.41 |
| 2011/0218921 A1* | 9/2011 | Addala ................ G06Q 10/103 705/301 |
| 2011/0231224 A1* | 9/2011 | Winters ............. G06Q 30/0201 705/7.29 |
| 2011/0238528 A1* | 9/2011 | Bezos ................ G06Q 30/0246 705/26.8 |
| 2012/0253985 A1* | 10/2012 | Maron ................... G06Q 30/06 705/27.1 |
| 2013/0030875 A1* | 1/2013 | Lee .................. G06Q 10/06311 705/7.38 |
| 2013/0103187 A1* | 4/2013 | Canter ................... G06Q 20/12 700/232 |
| 2013/0138517 A1 | 5/2013 | Khan |
| 2013/0191230 A1 | 7/2013 | Edwards |
| 2014/0100912 A1* | 4/2014 | Bursey .................... H04W 4/70 705/7.27 |
| 2014/0236672 A1* | 8/2014 | Yoder .................... G06Q 30/00 705/7.29 |
| 2015/0039462 A1* | 2/2015 | Shastry .............. G06Q 30/0633 705/26.7 |
| 2015/0073938 A1* | 3/2015 | Chuma ............. G06Q 30/0214 705/26.41 |
| 2015/0095173 A1 | 4/2015 | Wong |
| 2015/0269561 A1* | 9/2015 | Barrett ................... G06Q 20/28 705/17 |
| 2016/0171399 A1* | 6/2016 | Santhanam ...... G06Q 10/06316 705/7.36 |
| 2016/0232515 A1* | 8/2016 | Jhas ....................... G06Q 30/02 |
| 2017/0004422 A1 | 1/2017 | Todd |
| 2017/0161728 A1 | 6/2017 | Satyanarayan |
| 2018/0089654 A1 | 3/2018 | Licht |

OTHER PUBLICATIONS

International Search Report and Written Opinion issued in Intenational Application No. PCT/US2014/071559 dated Apr. 23, 2015.
International Preliminary Report on Patentability issued in International Application No. PCT/US2014/071559 dated Jun. 21, 2016.
UKIPO; App. No. GB1610930.8; Examination Report dated Aug. 20, 2020.
UKIPO; App. No. GB1610930.8; Examination Report dated Feb. 25, 2021.
CIPO; App. No. 2,934,657; Office Action dated Feb. 5, 2021.

* cited by examiner

SYSTEMS AND METHODS FOR EVENT DETECTION AND DEVICE CONTROL IN A DISTRIBUTED COMPUTING ENVIRONMENT

RELATED APPLICATIONS

This application is a 35 U.S.C. § 371 National Stage filing of International Application No. PCT/US2014/071559, entitled "SYSTEMS AND METHODS FOR SALES EXECUTION ENVIRONMENT," filed on Dec. 19, 2014, which claims priority to U.S. Provisional Patent Application Ser. No. 61/919,042, entitled "Systems and Methods for Sales Execution Environment," filed on Dec. 20, 2013, U.S. Provisional Patent Application Ser. No. 61/919,036, entitled "Systems and Methods for Sales Execution Environment," filed on Dec. 20, 2013, U.S. Provisional Patent Application Ser. No. 61/919,034, entitled "Systems and Methods for Sales Execution Environment," filed on Dec. 20, 2013, and U.S. Provisional Patent Application Ser. No. 61/919,030, entitled "Systems and Methods for Sales Execution Environment," filed on Dec. 20, 2013, which are hereby incorporated by reference in their entirety.

BACKGROUND

Point-of-Sale (POS) systems are used to complete sales transactions by accepting payment from a customer. Traditional POS systems often only address transactions occurring in a physical store or an online store, rather than integrating all aspects of a sales process. Additionally, modifying traditional POS systems to incorporate changes in technology and business is difficult. Most POS systems also do not provide interface capabilities with third-parties.

SUMMARY

Exemplary embodiments of the present disclosure are directed to facilitating a task in a retail commerce environment. In accordance with embodiments of the present disclosure, a system for facilitating a task in a retail commerce environment is disclosed. The system includes a hardware-implemented presentation module that is configured to send a request to facilitate performance of a commerce-related task and render a result of the performance of the commerce-related task. The system also includes a hardware-implemented orchestration module that is configured to coordinate a task flow, in response to receiving the request from a client device. The coordination of the task flow includes determining an execution sequence for the services associated with the commerce-related task. The orchestration module is also configured to invoke the services in order according to the execution sequence and trigger rules and events associated with the service. The orchestration module is also configured to route information based on the task flow between the rules, events, and services to facilitate completion of the commerce-related task. The system also includes a hardware-implemented administration module that is configured to maintain the services and administer customizations to the services.

In accordance with embodiments of the present disclosure, the presentation module may also be configured to facilitate interfacing with a peripheral device that may be required for the performance of the commerce-related task. The orchestration module may also be configured to route the information using a messaging module that facilitates communication between various modules. The administration module may also be configured to perform real-time event pattern analysis to facilitate performance of the commerce-related task. The system may also include a hardware-implemented market module that may be configured to maintain services, rules, and events specific to a market, and administer customizations to the services, the rules, and the events specific to the market. The system may also include a hardware-implemented enterprise module that may be configured to integrate operational systems of the retail commerce environment. The system may also include a hardware-implemented security module that may be configured to authenticate the client device and grant the client device access to the system. The system may also include a messaging module that may be configured to translate communications from a sender module to a form understandable by a recipient module. The system may also include a hardware-implemented third-party module configured to integrate third-party systems with the system, and the third-party systems may include a third-party vendor, a compliance agency, or a fiscal entity. The system may also include a market module that may be configured to receive information associated with a modification of the service of the plurality of services, where the modification may include associating an event with the service, associating a rule with the service, modifying the execution sequence, or adding an additional service to the execution sequence. The market module may further implement the modification, and update the service and the execution sequence based on the modification, and invoke the plurality of services based on the updated service and updated execution sequence.

In accordance with embodiments of the present disclosure, in a commerce environment, a computer-implemented method is provided for facilitating a task in the commerce environment. A request to facilitate performance of a commerce-related task is sent from a client device. In response to receiving the request, a task flow is coordinated, which includes an execution sequence for the services associated with the commerce-related task. The services are invoked in order according to the execution sequence. Rules and events associated with the services are also invoked. Information is routed based on the task flow between the rules, events, and services to facilitate completion of the commerce-related task. The services are maintained and customizations are administered. The result of the performance of the commerce-related task is rendered for the client device. The method also includes receiving information associated with a modification of a service. The modification may include associating an event with the service, associating a rule with the service, modifying the execution sequence, or adding an additional service to the execution sequence. The modification may be implemented and the service and execution sequence are updated. The services are invoked based on the updated services and execution sequence. The method may also include a step of integrating with third-party systems such as, a third-party vendor, a compliance agency, or a fiscal entity. The method may also include interfacing with a peripheral device that may be required for facilitating the performance of the commerce-related task. The method may also include performing real-time event pattern analysis to facilitate performance of the commerce-related task.

In accordance with embodiments of the present disclosure, a non-transitory computer-readable storage device configured to store instructions executable by a processing device is disclosed. Execution of the instructions in a retail commerce environment causes the processing device to implement a method for facilitating a task in the retail commerce environment. The processing device reads instructions to send a request, from a client device, to facilitate performance of a commerce-related task, render a result of the performance of the commerce-related task, and in response to receiving the request to facilitate performance of the commerce-related task, coordinate a task flow. The coordination of the task flow includes an execution sequence for the services associated with the commerce-related task. The processing device also reads instructions to invoke the services in order according to the execution sequence, and also triggering rules and events associated with a service. The instructions are also to route information based on the task flow between the rules, the events, and the services to facilitate completion of the commerce-related task, maintain the plurality of services, and also administer customizations to the plurality of services. The processing device may also read instructions to integrate third-party systems, where the third-party systems may be a third-party vendor, a compliance agency, or a fiscal entity. The processing device may also read instructions to perform real-time event pattern analysis to facilitate performance of the commerce-related task, and to interface with a peripheral device that may be required for the performance of the commerce-related task.

Exemplary embodiments of the present disclosure are directed to executing a multistep commerce-related task in a commerce environment. In accordance with embodiments of the present disclosure, a computer-implemented method for executing a multistep commerce-related task in a commerce environment is disclosed. The method includes receiving a request in a computer-readable format for execution of a commerce-related task in a commerce environment, and programmatically retrieving a task flow from a non-transitory computer-readable medium in response to the request. The task flow identifies sub-tasks and defines a sequence with which to execute the sub-tasks to facilitate completion of the commerce-related task. The method also includes controlling an order of execution of the sub-tasks according to the sequence defined by the task flow. The sub-tasks are executed independently and discretely of each other.

In accordance with embodiments of the present disclosure, the method may also include receiving a request to evaluate a rule associated with one of the sub-tasks, and evaluating the rule based on criteria corresponding to the rule. The method may further include receiving a request to execute a sub-task of the sub-tasks, invoking a service corresponding to the sub-task, the service facilitating execution of the sub-task, receiving a result of the sub-task as a result of execution of the sub-task, and sending confirmation that the sub-task is executed. The request may be received from a client device, and the client device may be a device used by a customer, a sales associate, a department manager, a floor manager, a sales manager, an inventory manager, a supplier, a distributor, or a third-party vendor. The commerce-related task may include a task related to adding an item to a shopping cart, ordering an item, checking a price of an item, calculating a shipping cost for an item, paying for an item, or returning an item. The request may include context information associated with the commerce-related task, the context information may be required to execute the sub-tasks of the task flow.

In accordance with embodiments of the present disclosure, a system for executing a multistep commerce-related task in a commerce environment is disclosed. The system includes a processor implemented orchestration module that is configured to receive a request in a computer-readable format for execution of a commerce-related task in a commerce environment, and retrieve a task flow from a non-transitory computer-readable medium in response to the request. The task flow identifies sub-tasks and defines a sequence with which to execute the sub-tasks to facilitate completion of the commerce-related task. The processor implemented orchestration module if further configured to control an order of execution of the sub-tasks according to the sequence defined by the task flow. The sub-tasks are executed independently and discretely of each other.

In accordance with embodiments of the present disclosure, the system may also include a rule module configured to receive a request to evaluate a rule associated with one of the sub-tasks, and evaluate the rule based on criteria corresponding to the rule. The orchestration module may further receive a request to execute a sub-task of the sub-tasks, invoke a service corresponding to the sub-task to facilitate execution of the sub-task, receive a result of the sub-task as a result of execution of the sub-task, and send confirmation that the sub-task is executed. The system may also include an extension module that may be configured to receive a modification of the sub-task, and implement the modification of the sub-task. The request may include context information associated with the commerce-related task, the context information may be required to execute the sub-tasks of the task flow. The commerce-related task may include a task related to adding an item to a shopping cart, ordering an item, checking a price of an item, calculating a shipping cost for an item, paying for an item, or returning an item. The request may be received from a client device.

In accordance with embodiments of the present disclosure, a non-transitory computer-readable storage device configured to store instructions executable by a processing device is disclosed. Execution of the instructions in a commerce environment causes the processing device to implement a method of executing a multistep commerce-related task in the commerce environment. The processing device reads instructions to receive a request in a computer-readable format for execution of a commerce-related task in a commerce environment, and retrieve a task flow in response to the request. The task flow identifies sub-tasks and defines a sequence with which to execute the sub-tasks to facilitate completion of the commerce-related task. The processing device further reads instructions to control an order of execution of the plurality of sub-tasks according to the sequence defined by the task flow, the plurality of sub-tasks being executed independently and discretely of each other.

In accordance with embodiments of the present disclosure, the processing device may also read instructions to receive a request to evaluate a rule associated with one of the plurality of sub-tasks, and evaluating the rule based on criteria corresponding to the rule. The processing device may also read instructions to receive a request to execute a sub-task of the plurality of sub-tasks, invoke a service corresponding to the sub-task, the service facilitating execution of the sub-task, receive a result of the sub-task as a result of execution of the sub-task, and send confirmation that the sub-task is executed. The commerce-related task may include a task related to adding an item to a shopping cart, ordering an item, checking a price of an item, calculating a shipping cost for an item, paying for an item, or returning an item. The request may be received from a client device, and the client device may be a device used by a customer, a sales associate, a department manager, a floor manager, a sales manager, an inventory manager, a supplier, a distributor, or a third-party vendor.

Exemplary embodiments of the present disclosure are directed to reconfigurable rules in response to execution of a task in a commerce environment. In accordance with embodiments of the present disclosure, a computer-implemented method of implementing reconfigurable rules in response to execution of a task in a commerce environment is disclosed. The method includes specifying a rule associated with a sub-task in a multi-step commerce-related task, the sub-task is implemented as a separate sub-task data structure than other sub-tasks in the multi-step commerce-related task and the rule is implemented as a separate rule data structure than the separate sub-task data structure. The method also includes executing the multi-step commerce-related task in a commerce environment, triggering the rule in response to execution of the sub-task, analyzing information generated in response to execution of the multi-step commerce related task to determine whether the rule has been satisfied, and determining whether to continue executing the multi-step commerce-related task based on a determination of whether the rule has been satisfied.

In accordance with embodiments of the present disclosure, the method may also include triggering the rule by invoking the rule as a separate task within the sub-task. The method may also include modifying the rule by changing the rule data structure, where modifying the rule may alter a programmatic behavior of the multi-step commerce-related task without modifying the sub-task and the other sub-tasks of the multi-step commerce-related task. The rule may invoke one or more actions based on a bin number of a credit card being utilized to facilitate a commerce transaction. The rule may prompt a user via a graphical user interface to query a customer. The method may also include aborting the multi-step commerce-related task in response to determining that the rule has not been satisfied. The method may also include modifying the sub-task by changing the sub-task data structure to alter a programmatic behavior of the multi-step commerce-related task without modifying the rule data structure.

In accordance with embodiments of the present disclosure, a system for implementing reconfigurable rules in response to execution of a task in a commerce environment is provided. The system includes a task module configured to specify a rule associated with a sub-task in a multi-step commerce-related task, the sub-task is implemented as a separate sub-task data structure than other sub-tasks in the multi-step commerce-related task and the rule is implemented as a separate rule data structure than the separate sub-task data structure, and execute the multi-step commerce-related task in a commerce environment. The system also includes a processor implemented rules engine configured to trigger the rule in response to execution of the sub-task, analyze information generated in response to execution of the multi-step commerce related task to determine whether the rule has been satisfied, and determine whether to continue executing the multi-step commerce-related task based on a determination of whether the rule has been satisfied. The triggering of the rule may include invoking the rule as a separate task within the sub-task. The rules engine may further modify the rule by changing the rule data structure. Modifying the rule may alter a programmatic behavior of the multi-step commerce-related task without modifying the sub-task and the other sub-tasks of the multi-step commerce-related task. The rule may invoke one or more actions based on a bin number of a credit card that is utilized to facilitate a commerce transaction. The rules engine may further abort the multi-step commerce-related task in response to determining that the rule has not been satisfied. The task module may modify the sub-task by changing the sub-task data structure to alter a programmatic behavior of the multi-step commerce-related task without modifying the rule data structure.

In accordance with embodiments of the present disclosure, a non-transitory computer-readable storage device configured to store instructions executable by a processing device is disclosed. Execution of the instructions in a commerce environment causes the processing device to implement a method of implementing reconfigurable rules in response to execution of a task in the commerce environment. The processing device reads instructions to specify a rule associated with a sub-task in a multi-step commerce-related task, the sub-task is implemented as a separate sub-task data structure than other sub-tasks in the multistep commerce-related task and the rule is implemented as a separate rule data structure than the separate sub-task data structure. The processing device also read instructions to execute the multi-step commerce-related task in a commerce environment, trigger the rule in response to execution of the sub-task, analyze information generated in response to execution of the multi-step commerce related task to determine whether the rule has been satisfied, and determine whether to continue executing the multi-step commerce-related task based on a determination of whether the rule has been satisfied. The processing device may also read instructions to modify the sub-task by changing the sub-task data structure to alter a programmatic behavior of the multi-step commerce-related task without modifying the rule data structure. The triggering of the rule may include invoking the rule as a separate task within the sub-task. Modifying the rule may alter a programmatic behavior of the multi-step commerce-related task without modifying the sub-task and the other sub-tasks of the multi-step commerce-related task.

Exemplary embodiments of the present disclosure are directed to detecting an event in response to execution of a task in a commerce environment. In accordance with embodiments of the present disclosure, a computer-implemented method for detecting an event in response to execution of a task in a commerce environment is disclosed. The method includes receiving information in response to an execution of a first computer process corresponding to a first task in a commerce environment, analyzing the information to dynamically detect an event based on a contemporaneous formation of event criteria and to determine a priority of the event, triggering the event based on satisfaction of the event criteria, and determining whether to automatically initiate execution of a second computer process corresponding to a second task based on the priority of the event.

In accordance with embodiments of the present disclosure, the method may also include distributing the event to one or more context groups based on a type of event that is triggered or a type or commerce-related task is executed. The method may also include invoking event orchestration, including performing a predefined sequence of services associated with the event and may be required to perform a task in a commerce environment. The method may also implement a push model which includes distributing the event to subscribers of the event, determining that the event and consumer service are available, and in response to the determining, invoking the event orchestration. The push model may also include receiving a request to subscribe to the event, subscription allowing to receive a notification of the event occurring, and accepting the subscription. The method may also implement a pull model including observing the event in a topic, determining that the event is available, and in response to the determining, invoking the event orchestration. The pull model may further include in response to the determining, triggering another event instead of invoking the event orchestration.

In accordance with embodiments of the present disclosure, a system for detecting an event in response to execution of a task in a commerce environment is disclosed. The system includes a processor implemented event manager that is configured to receive information in response to an execution of a first computer process corresponding to a first task in a commerce environment, analyze the information to dynamically detect an event based on a contemporaneous formation of event criteria and to determine a priority of the event. The event manager also configured to trigger the event based on satisfaction of the event criteria, and determine whether to automatically initiate execution of a second computer process corresponding to a second task based on the priority of the event. The event manager may be also configured to distribute the event to one or more context groups based on a type of event that is triggered or a type of commerce-related task that is executed. The event manger may be further configured to invoke event orchestration, including performing a predefined sequence of a plurality of services associated with the event and required to perform a task in a commerce environment. The system may also include a push module configured to distribute the event to subscribers of the event, determine that the event and consumer service are available, and in response to the determining, invoke the event orchestration. The push module may also be configured to receive a request to subscribe to the event, where the subscription allows to receive a notification of the event occurring, and accept the subscription. The system may also include a pull module configured to observe the event in the topic, determine that the event is available, and in response to the determining, invoke the event orchestration. The pull module may also in response to the determining, trigger another event instead of invoking the event orchestration.

In accordance with embodiments of the present disclosure, a non-transitory computer-readable storage device configured to store instructions executable by a processing device is disclosed. Execution of the instructions in a commerce environment causes the processing device to implement a method for detecting an event in response to execution of a task in the commerce environment. The processing device reads instructions to receive information in response to an execution of a first computer process corresponding to a first task in a commerce environment, analyze the information to dynamically detect an event based on a contemporaneous formation of event criteria and to determine a priority of the event. The instructions further to trigger the event based on satisfaction of the event criteria, and determine whether to automatically initiate execution of a second computer process corresponding to a second task based on the priority of the event. The processing device may also read instructions to distribute the event to one or more context groups based on a type of event that is triggered or a type of commerce-related task that is executed.

In accordance with embodiments of the present disclosure, the processing device may also read instructions to invoke event orchestration, and perform a predefined sequence of services associated with the event and required to perform a task in a commerce environment. The processing device may also read instructions to distribute the event to subscribers of the event, determine that the event and consumer service are available, in response to the determining, invoke the event orchestration, receive a request to subscribe to the event, where the subscription allows to receive a notification of the event occurring, and accept the subscription. The processing device may also read instructions to observe the event in the topic, determine that the event is available, and in response to the determining, invoke the event orchestration. The processing device may also read instructions to trigger another event instead of invoking the event orchestration.

Any combination or permutation of embodiments is envisioned. Other objects and features will become apparent from the following detailed description considered in conjunction with the accompanying drawings.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXEMPLARY EMBODIMENTS

Figure 1:
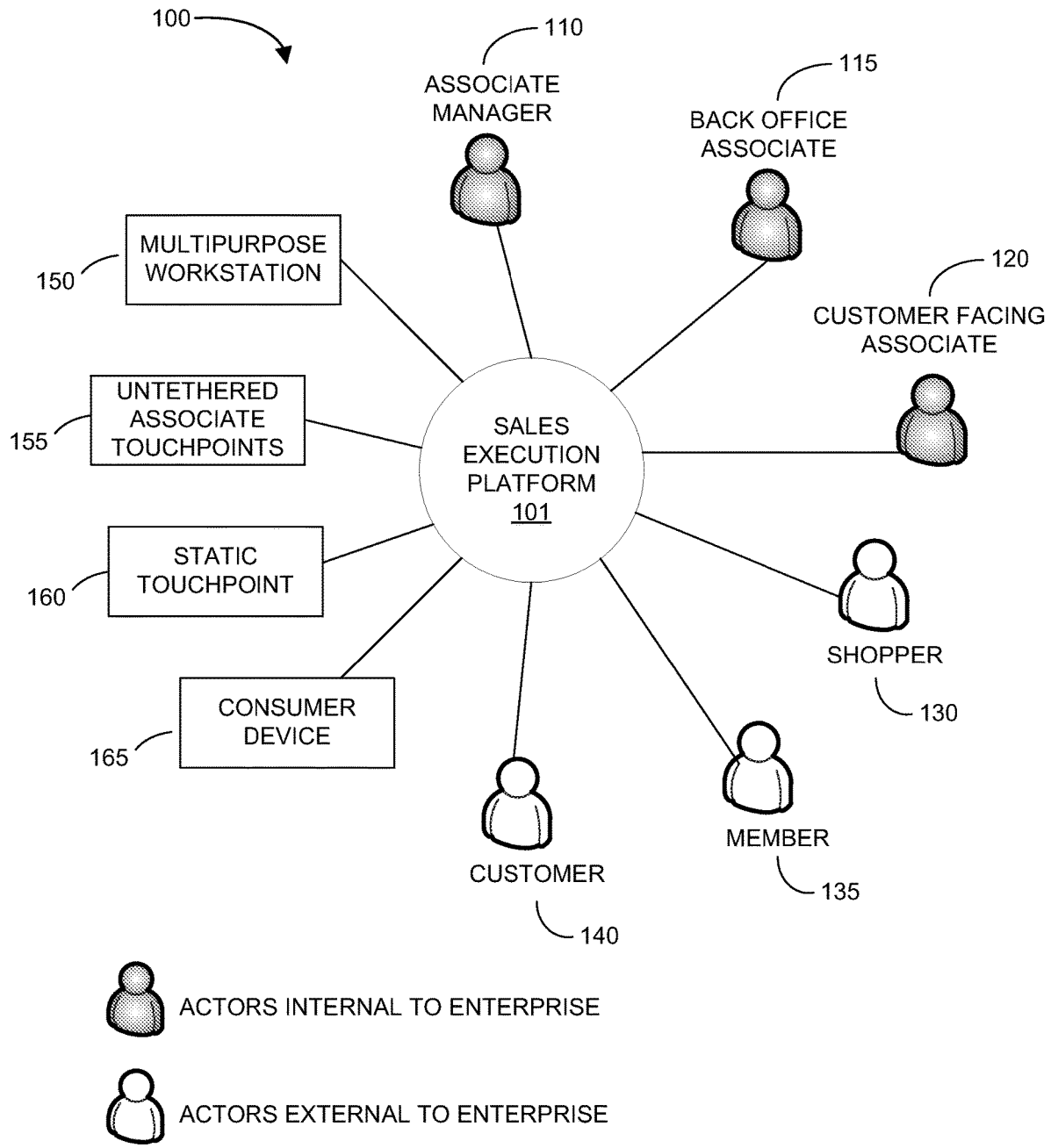
FIG. 1 is a diagram of an exemplary system illustrating actors and devices capable of communication with a sales execution environment, according to an example embodiment.

Systems, methods and computer-readable media are provided for a Sales Execution Environment in a commerce environment. The Sales Execution Environment (SEE), among other things, empowers the customer to shop anywhere at any time, and inspires the customer with product and service offerings. The SEE supports customer devices and channels of choices, allowing the customer to shop as they want.

In exemplary embodiments, the SEE provides an architecture, governance, roles and relationships that deliver systems and processes to support in-store, near-store, and remote customer interactions. The SEE provides customer-facing systems which support seamless cross-channel customer browsing and shopping interactions within store or near-store environments. As such, the SEE includes architectural features and functions that support the point-of-sale experience as well as interfaces and integration to enterprise and vendor systems, combined with governance and operating models to manage and deliver the functionalities described herein. The SEE addresses market and customer requirements at a global level while emphasizing market autonomy. Individual markets are able to innovate and deliver market-specific capabilities at their own market-speed. These capabilities may be incorporated into a global platform whenever there is cross-market potential.

The SEE delivers business capabilities that enable the next generation of sales execution. The benefits of the SEE include flexibility to change at the speed of local business and provide a competitive edge, and enable markets to design and deliver user interfaces and processes that are up-to-date with current and future sale-models. The SEE also delivers an efficient store platform to innovate faster in local markets, and enables the store of the future and supports new formats and initiatives such as the Merchant Customer Exchange (MCX) and platform for mobile payments.

In some embodiments, the SEE can be implemented on a software platform that is referred to as the Sales Execution Platform (SEP) for discussion purposes. The SEP architecture guides designers with a known, but limited set of choices, and provides markets the ability to innovate locally. The SEP advantageously utilizes extensibility to provide a flexible and dynamic environment for implementing processes, tasks, operations, and the like associated with a commerce environment. The SEP is designed to accommodate flexible business models, such as, omni-channel, consumer-centric, market-specific payment trends (contact-less, mobile devices, smart cards, traditional). The SEP can also accommodate market differences in various areas (geographical trends, store and brand trends, demographics), change in technology, a variety of devices for a variety of actors, and in a number of flexible deployment scenarios. Service-oriented integration of the SEP balances loose-coupled components with performance. The SEP also provides an improved customer experience, and leverages common services and data to simplify maintenance and deployment. For example, one component is provided to manage the SEP, while another component is provided to change the SEP.

For example, the SEP utilizes modularity of components to provide functionalities of the SEE. For example, instead of defining a process to complete a task as a single large component exemplary embodiments of the SEP are programmed or configured to break the process up into various small or sub components. Because of the modularity of the components, components can be reused to fulfill different tasks, and it is easier to deploy individual components after modifications. For example, a process for adding items to an electronic shopping basket implemented as various software components, such as, calculate discount, calculate taxes, evaluate restricted item rule, and the like. An orchestration component, discussed in detail below, is responsible for realizing when these components need to be executed, and which entity needs to be called to execute them. After these various components are executed in a specified sequence, the task of adding items to the shopping basket is completed. Since, calculate discount and calculate taxes are separate components that do not necessarily depend on the overall task of adding items to the shopping basket, these components can be used in other tasks with or without being modified. For example, the calculate discount and calculate taxes components can be used in completing a task of accepting payment because the discounts and taxes have to be recalculated in case a price of an item in the shopping basket changed by the time the customer is ready to pay. Instead of developing new components for discount and taxes, the same components from the add items to the shopping basket process can be used for the accept payment process. Furthermore, changes to the calculate discount and calculate taxes are applied to the component itself, and the processes for the different tasks or components do not need updating. The processes automatically use the updated components. In this manner, the modularity of the components of the SEE simplifies modifications, maintenance and deployment of processes due to market changes and innovation.

The SEE and SEP facilitate execution of a sales transaction as described below. A sales transaction, as used in the present disclosure, can refer to any commerce-related task that needs to be performed in a commerce environment. The commerce-related task can be a multi-step task that includes one or more sub-tasks. The multi-step commerce-related task and the sub-tasks may also be referred to as candidate services or services, within a service-orientated architecture. The various aspects of the SEE and SEP are described below in more detail. Some of these aspects are discussed as being implemented with store systems and processes. However, it should be understood that the systems and methods disclosed herein can be implemented as part of any business entity to enhance their commerce-related processes.

Actors and Devices

Various actors and devices interact with the SEE. An actor is a user interacting with the SEE. An actor may refer to a class of user roles rather individual users or specific user roles themselves. For example, actors may correspond to a Customer-Facing Associate role. The Customer-Facing Associate role is a class of user roles that includes, for example, actual store roles, such as Front End Cashier, Customer Service Desk, and the like. Actors can use devices to interact with the SEE. A device may be any point-of-contact with the SEE and can include, for example, multipurpose workstations, consumer devices (e.g., mobile phones, tablets, etc.), static touchpoints, untethered associate touchpoints, and the like. The devices interacting with the SEE may have various characteristics. Some of these characteristics can include, but are not limited to ownership (in-house owned versus customer-owned), portability (affixed to a store versus handheld device), and functionality (the number of functions it can perform).

Devices support predefined interactions between actors and the SEE. These interactions may describe functional characteristics of components built into the SEP, and may also imply non-functional requirements (for example, system availability, service level agreements, and the like) that the components may support. For example, a Customer-Facing Associate (actor) using a Tablet (device) outside the store may require that SEP provide a store-forward capability (e.g., component) to allow the Associate to transact sales without concern of network connectivity issues. As another example, SEP may allow a Customer (actor) at a store Kiosk (device, for example, a multipurpose station or an in-store station) to combine their online order with in-store items into a single shopping basket while preventing them from viewing another Customer's orders or access store sales data. In this manner, an actor/device combination may be used to determine valid combinations, define interactions with the SEP, implement key use cases, and implement non-functional requirements of the SEP.

One example of the actors may be an Associate Manager role. The Associate Manager role includes associates that have managerial responsibilities such as associate scheduling, overriding and approving transactions, and monitoring store activities. Such associates may be, for example, a pharmacist (a salaried associate that manages the pharmacy and is accountable for prescriptions), a customer service manager or customer operations supervisor (a supervisor who monitors the front end cashiers, manages cash flow, overrides and the register, and scheduling enforcement), a front end manager (a manager that coordinates customer service managers, and maintains a consistent checkout experience), an assistant manager (an assistant manager that is accountable for the store), a store manager (a manager that is accountable for the store), and the like.

Another example of the actors may be a Back Office Associate role. The Back Office Associate role includes associates that may perform functions, such as stocking the shelves or supporting store operations with tasks like balancing daily store funds, coupons, accounts, and the like. Yet another example of the actors may be a Customer role. The Customer role includes consumers that shop in a store for merchandise and services, and have opted to share their personal information so that they are recognized by the SEP. Such people may use store services like Pharmacy, Automotive Care (for example, Tire and Lube Express), Jewelry, Bill Paying, Money Desk, and the like. By providing personal information, they can transact across multiple channels and receive personalized offers and coupons. As mentioned above, one of the actors may include a Customer-Facing Associate role. The Customer-Facing Associate role includes associates in customer-facing roles such as the Front End Cashier, Customer Service Desk, Money Service Desk Cashier, Vision Center Associate, Automotive Care Associate, Jewelry Associate, Layaway Associate, Sporting Goods Associate, Pharmacy Technician Associate, Customer Service Associate, the Line Rusher Associate and the like.

One example of actors may be a Member role, which includes customers that purchased a membership account with one or more stores operated by a business entity utilizing the SEP. This account may be valid for a predetermined period of time, for example, one year. Multiple Customers, for example husband and wife, can belong to a single account. Like Customers, Members can transact in multiple channels and receive personalized coupons and offers. In addition, Members receive benefits from the store(s), such as rewards and special discounts on services such as travel and insurance. Another example of actors may be a Shopper role, which includes people that shop in a store for merchandise and services. Unlike Customer, this Actor may be anonymous to the store. Shoppers may use mobile devices at the store, but can only transact in a single channel (the store).

As discussed above, devices may include, for example, a Consumer Device, a Multipurpose Workstation, a Static Touchpoint, and an Untethered Associate Touchpoint. A Consumer device may be devices owned by Customers, Shoppers or Members that are capable of interacting with the SEE. Such devices include, but are not limited to, personal computer, laptop, mobile device, smartphone, cellular phone, tablet, personal digital assistant (PDA), smartwatch, portable global positioning system (GPS), vehicle navigation system, cash register, bar-code scanner, printer, and the like. A Multipurpose Station may be personal computers (PCs) that are used for various purposes at the store in areas such as Pharmacy, Automotive Care and the Customer Service Manager (CSM) Workstation which is used by a Customer Service Manager to, for example, manage cashiers, breaks, lunches, change orders, price lookups, and the like. A Multipurpose Station may also include devices such as laptop, mobile device, smartphone, cellular phone, tablet, personal digital assistant (PDA), cash register, and the like. A Static Touchpoint may be devices that are physically anchored to the store, such as, Scales, Scanners, Printers, Coin/Bill Accepter-Dispensers, Debit Readers, Registers, Self-Checkout Registers, Controllers, Kiosks, and the like. An Untethered Associate Touchpoint may be store-owned and operated devices that allow the associates to move around the store as they help Customers, Shoppers and Members. Such devices may include, but are not limited to, laptop, mobile device, smartphone, cellular phone, tablet, personal digital assistant (PDA), smartwatch, scanners, and the like.

FIG. 1 is a diagram of an exemplary system 100 illustrating actors 110, 115, 120, 125, 130, 135, 140 and devices 150, 155, 160, 165 capable of communication with the SEP 101, according to an example embodiment. System 100 includes actors internal to or employed by the store(s), such as, Associate Manager 110, Back Office Associate 115, and Customer-Facing Associate 120. System 100 also includes actors external to store(s), such as, Shopper 130, Member 135, and Customer 140. Devices, such as, Multipurpose Workstation 150, Untethered Associate Touchpoints 155, Static Touchpoint 160, and Consumer Device 165, are also included in system 100. These actors and devices are capable of interacting with the Sales Execution Platform 101 that is implemented utilizing embodiments of the Sales Execution Environment (SEE) as described herein.

External Interfaces

To support a retail business model, the SEE is integrated with various Market-sensitive interfaces and Enterprise interfaces (e.g., customer and vendor facing interfaces), which are discussed in more detail below. The SEE empowers innovation in at least three following ways: (1) configuration, including the ability to customize for market-specific behavior without code changes, (2) extension, including the ability to enhance SEP with market-supplied components within the confines of an SEP interface, and (3) augmentation, including the ability to deploy market-owned interfaces and components that amplify SEP functionality in a way that is unique to the market.

Figure 2:
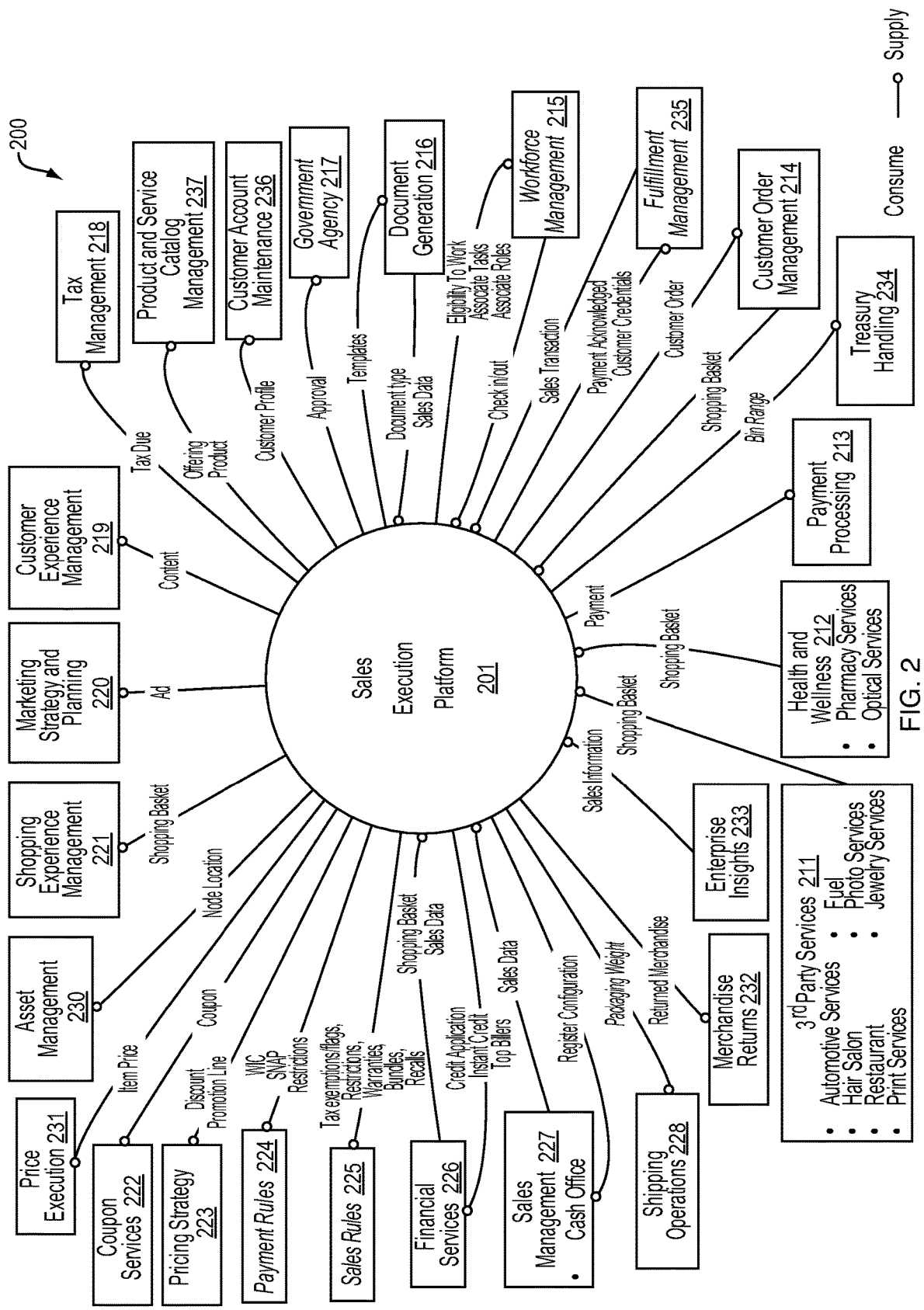
FIG. 2 is a diagram of an exemplary system illustrating the Market-sensitive interfaces and Enterprise interfaces integrated with a sales execution environment, according to an example embodiment.

FIG. 2 is a diagram of an exemplary system 200 illustrating the Market-sensitive interfaces and Enterprise interfaces integrated with the SEE and utilized by the SEP 201, according to an example embodiment. Market interfaces refer to interfaces that may be configured for specific business units based on, for example, a particular country or environment. For example, Market interfaces may be available for club member stores or stores in Brazil or India. Enterprise interfaces refer to interfaces that may be configured for some, all, or none of the stores as well as enterprise offices associated with the stores. The various interfaces included in system 200 are described below. The information communicated between the interfaces and the SEE 201 are also described below. The Market-sensitive interfaces may include the following interfaces 211-228 described below.

Third-Party Services Interface 211 are applications and services such as Fuel, Photo, Jewelry, Hair Salon, Restaurant, Automotive Care, and the like, which interact with the SEP 201 to collect payment and print necessary documents such as Receipts and Warranty Information. Health and Wellness Interface 212 includes systems supporting pharmacy and optical goods and services. The Health and Wellness Interface 212 handles special security considerations that may be required to assure compliance with Health Insurance Portability and Accountability Act (HIPAA) and Personally Identifiable Information (PII) polices. Payment Processing Interface 213 handles market-specific technology or product used to collect payments from Shoppers or Customers. The Payment Processing Interface 213 may support over 40 tender types, including credit card, gift card, debit cards, and the like.

Customer Order Management Interface 214 manages customer-facing orders which enables store(s) to sell any inventory in its supply chain, not just what is currently on the shelves. In an omni-channel environment, the Customer Order Management Interface 214 enables store(s) to sell anywhere, order anywhere, fulfill from anywhere, and dispense it to the customer at the time, place and manner of their choosing. The Customer Order Management Interface 214 enhances the customer's experience and send the brand message that the store is here to help them save money so they can live better. Workforce Management Interface 215 manages the local rules regarding Associates' time and attendance. These rules are often for hourly employees (e.g. payroll) and are different than scheduling rules. For example, a rule may not allow a Cashier to log in while they are clocked out. There is a repository of the store employees that have been granted roles to access the SEP.

Document Generation Interface 216 is responsible for generating documents such as receipts, contracts, warranties and other such communications relevant to the items being purchased. The Document Generation Interface 216 handles transactions that require certain information be printed on a receipt or use a specific printer for its generation. Government Agency Interface 217 handles interactions between government agencies and the store(s) for purposes of compliance and/or fiscal requirements. For example, the Chilean Government may require that customers are identified prior to completing transactions. Other examples include anti-money laundering detection and purchases of hazardous items. Tax Management Interface 218 is an interface to systems that embody the rules imposed by fiscal or government agencies to collect sales taxes per applicable tax jurisdiction regulations.

Customer Experience Management Interface 219 uses knowledge of the customer to present opportunities to increase the level of service provided or profitable customer interactions which they are interested in, including personalized content and offers to be displayed at POS devices. Marketing Strategy and Planning Interface 220 determines promotional messages and influence shopper purchase through a variety of interaction points. Shopping Experience Management Interface 221 addresses a demographic or some segment of shoppers, without the ability to specifically know them as a person. For example, if a customer buys a specific food item, recipes associated with the food item may be offered. It may also be responsible for providing content to be displayed at POS devices.

Coupon Services Interface 222 provides the ability to handle not only physical coupons, but virtual ones as well, and also be able to show the customer specific coupons which could help them lower the cost of their purchase even though they may not have known about their existence. Pricing Strategy Interface 223 consists of system(s) that encapsulate the rules regarding promotions and discounts. The Pricing Strategy Interface 223 includes link-saves and item discounts (for instance when a certain group of items are purchased together). Payment Rules Interface 224 handles the variety of rules associated with payment. For example these rules may include, items that cannot be bought under the Women In Crisis (WIC) program, items that cannot be bought under the State Nutritional Assistance Program (SNAP) program, Payment Restrictions (cannot buy alcohol with certain card form of payment), and the like.

Sales Rules Interface 225 is a suite of applications managed in a central facility by, for example, a compliance team. The Sales Rules Interface 225 may include, for example, a rule that prevents a store from selling a recalled item. Other rules include tax exemptions, tax flags (person needs to have certificate for exempt taxes), restrictions (Over 21 buying alcohol), Warranty (battery warranty), and bundling items. Financial Services Interface 226 handles the sale of services which involve financial transactions, such as, Bill Pay, Money-Gram, Check-Free, and the like, with the exclusions of banking services. These services include collecting information needed for the successful completion of the service.

Sales Management Interface 227 handles specific interactions required in running a profitable store. The Sales Management Interface 227 includes back office applications such as the decision support store Sales by hour, exception reports, store within a store, club within a club, load calendar data for "Store Within A Store" (SWAS) recap, Top 20 on hand changes, out-of-stock. SWAS refers to departments within a store that may be run independently from the store, therefore, run as a store itself. In some embodiments, data can be purged on a periodic or aperiodic bases. For example, this data can be purged on a "Specific Measurable Actionable Relevant Time-bound" (S.M.A.R.T) basis. It may further include Register Configuration, Cashier Restrictions, Cashier Roles, Cashier Schedule, Application that balances all payments, sum up all coupons, checks, and reconciliation is done within the store, Department sales, Register sales, Tax, Bank Card, and the like. Shipping Operations Interface 228 handles the ability to deliver store purchases to the customer's home or allowing stores to complete online orders by taking advantage of lower local shipping rates or local inventory.

Inventory Management/Perpetual Inventory Interface (not shown) provides for fiscal accounting of inventory as well as the ability to track current inventory counts. While 'brick-n-mortar' stores may focus on using inventory counts for merely replenishing inventory, the omni-channel environment may need access to accurate counts to assure the completion of a customer's online order in addition to replenishing inventory. Store Management Tools Interface (not shown) consists of management tools that allow supervisors and managers to see restricted information, make configuration changes for operational purposes and review financial reports.

The Enterprise interfaces may include interfaces 230-237 described below.

Asset Management Interface 230 has the ability to track assets financially and assure proper maintenance of assets. The Asset Management Interface 230 also supports a depreciation cycle of the assets as this enables possibilities to end-of-life some equipment. Price Execution Interface 231 is a system that provides the official prices for the items being sold at the store. Merchandise Returns Interface 232 includes systems that deal with returning merchandise to a supplier after a Customer Return.

Enterprise Insights Interface 233 generates Sales Reports, and is responsible for reporting on sales data for the purposes of Business Intelligence. There are at least two roles: to manage the tables in the store where everyone gets their data, and to make sure stores have clean data. At the central facility they go through and have an hourly and daily extract, in which they analyze and aggregate the data to provide a place for stores to get their data. Treasury Handling Interface 234 reconciles payments and balance accounts before they are written into the general ledger. The Treasury Handling Interface 234 also provides the bin ranges that are used to determine how to settle transactions. Bin ranges are an input to payment rules.

Fulfillment Management Interface 235 leverages the entire supply chain inventory to complete a customer's purchase. The transportation network and local stores can be leveraged to expand the assortment offered to customers. Examples include current interactions with store departments, such as Global E-Commerce (GEC), Jewelry, Automotive Care, and the like. This ability can be important when there is a basket full of item and services, and the only action left is to get payment for them. Customer Account Maintenance Interface 236 is a data repository of customer information built from shoppers that opted-in to the SEP. While the SEP may not own customer data, it does consume it in the form of Customer Profiles. For the purposes of the SEP, a club member (e.g., a customer that pays a fee for the ability to shop in a specified store) is treated as a special type of Customer. The Customer Account Maintenance Interface 236 allows customers to 'opt-in' to sharing specific information about themselves for expanded service and promotional opportunities.

Product and Service Catalog Management Interface 237 provides information about Offerings, Products and Items, including both central facility as well as Store Items. There are at least two types of items that reside on separate systems. Central facility items are managed centrally and as a consequence, there are purchase order and replenishment processes in place for these. In contrast, Store Items are unique to and sold by a store, for example, a Store Item can be apples grown by a local farm. Store Items may not benefit from the same enterprise replenishment and ordering processes as central facility items. In an example embodiment, these two types may be serviced by a single interface, rather than making multiple services that are sensitive to the nuances of the differences between the two. The Product and Service Catalog Management Interface 237 may also support the ability to leverage rich product information in stores, similar to the experience created online. Any information that can help customers learn more about their purchases helps influence the shopping experience.

The following information described may be communicated from the interfaces to the SEP 201. Approval Information such as successful payment transaction for a specific authorization. Associate Security Profile Information includes associates personal information, preferences and application roles. Bankcard Information is a file used by a cash office to balance sales transactions against a till drawer. Bin Range Information includes credit card number ranges used to identify the issuing credit agency. Bundle Information is a collection of items, when present, allow for a discounted price. Cashier Roles Information includes information related to roles such as an underage, cashier or supervisor. Cashier Schedule Information includes weekly schedule an associate is expected to work. Content Information is information shared through an application which is published as needed.

Credit Application Information is information that may be collected and submitted for consideration of extending credit. Customer Credentials Information is a token used to identify store customers. An account associated with Google, Facebook, or other services may be used to identify the specific customer profile. Customer Profile Information is information regarding customer preferences, order history, name, bill-to, ship-to, payments, default ship-to, save for later list, shopping list, coupon list, and the like. Deferred Payment Information is the ability of the store to complete an online purchase in the store with the payment collected and authorized online. Department Information includes information related to a unique collection of merchandise that may be sold. Discount Information may be an associate discount or a discount applied to the overall order. For example, the customer may have a special card which qualifies them for certain amount of discount on the purchase of specific merchandise.

Instant Credit Information is the information to process a credit application instantly and extend credit to the merchandise being purchased. Item Information is information that helps identify the merchandise. Item Price Information is the price information for a specific item at a location. The Item Price Information represents the current charge for an item, regardless of any appropriate discounts or coupons. Location Information is a physical, geographic location where a customer is at a particular point in time. Offering Information is the service or good that can be sold to the customer. Order Information is information for a transaction which represents the customer purchase of merchandise. The Order Information can represent a customer order from inventory in the supply chain, or merchandise being purchase at the store as a sales transaction.

Packaging Weight Information is the mass of the container the item is packaged in. The Packaging Weight Information is to allow to only charge per pound for the item and not charge for the weight of the packaging. Payment Acknowledged Information is the token used to reconcile payments between the POS, Cash Office and electronic payment (Epay) systems against what is settled with the Payment Issuers. Payment Credentials Information represents the physical or virtual credential accepted by payment systems to allow a credit charge. Payment Credentials Information reserves the right to collect on a debt, and not on the actual transfer of tender. Product Information is the information related to the item on the shelf. While an item is tied to a specific supplier, the Product Information is meant to represent the information presented to the customer to influence the purchasing decision. Promotion Line Information is information related to the merchandise being advertised to bring brand awareness or offer a reduced price to increase our rate of sale.

Recall Information are items which cannot be sold any longer due to concerns over the health and safety of customers. The Recall Information is often tied to a specific lot the item was manufactured in or to a specific supplier. Register Information is information related device or system used to complete transactions for goods or services. Register Configuration Information is the unique workflow the register is configured to follow given the merchandise being sold. Examples of unique workflows include workflows for purchasing Gun, Tobacco, Cell Phones, and the like. Restriction Information is a condition that must be enforced to ensure compliance with policies and regulations. For example, a restriction can be that a town does not allow alcohol to be sold on Sundays. Returned Merchandise Information is merchandise that a customer brings into the store to ask for a refund of payment. The Returned Merchandise Information can also be utilized for creating a claim with the supplier for credit. In some embodiments, merchandise is just destroyed as it is not worth the cost to return.

SNAP Information refers to information for the Supplemental Nutrition Awareness Program (SNAP) that offers assistance for low income citizens in their food purchases. The SNAP Information includes, for example, restrictions as to what a customer participating in SNAP can purchase. For example, a customer participating in SNAP cannot purchase tobacco. Tasks Information is information relating to specific activities that are assigned to associates to complete the work needed for the operation of the store. Tax Information is the tax that is to be collected for the sale based on specific government jurisdictional regulations. The tax may depend on multiple jurisdictions (city, county, state, federal, export, VAT, and the like) and multiple taxes on merchandise (sales tax, soda tax, and the like). Tax Due Information is the amount calculated as per government or fiscal organization rules based on the purchase a specific item. Tax Exemption Flags Information is the ability of an item to be excluded from a tax calculation, provided the customer has a tax exempt certificate on file.

Templates Information is basic layout patterns for specific documents that need to be generated. Top Billers Information are items which help drive consumers into the stores. Warranty Information is insurance on an item which allows for repair or replacement services for a period of time. Women, Infants and Children (WIC) Information is information related to a government program that allows lower income parents to pay for the necessary items to help raise healthy kids.

The following information described may be communicated to the interfaces from the SEP 201. Clock-in/out Information is the ability of associates to track their time on the clock. The Clock-in/out Information may only be needed for hourly associates to be paid based on hours worked. Document Type Information is specific type of document needing to be generated such as a Receipt or a Service Contract. Sales Data Information is a report on current value of sales transactions. Sales Transaction Information is an order created from a customer purchase of a shopping basket of items, with a focus on buying in the store or the club. Shopping Basket Information is a collection of items the customer desires to purchase. The Shopping Basket Information is the information available to systems to transact sales, for example, given a Shopping Basket, the SEP 201 collects payment and complete the sale.

Store Systems

Figure 3:
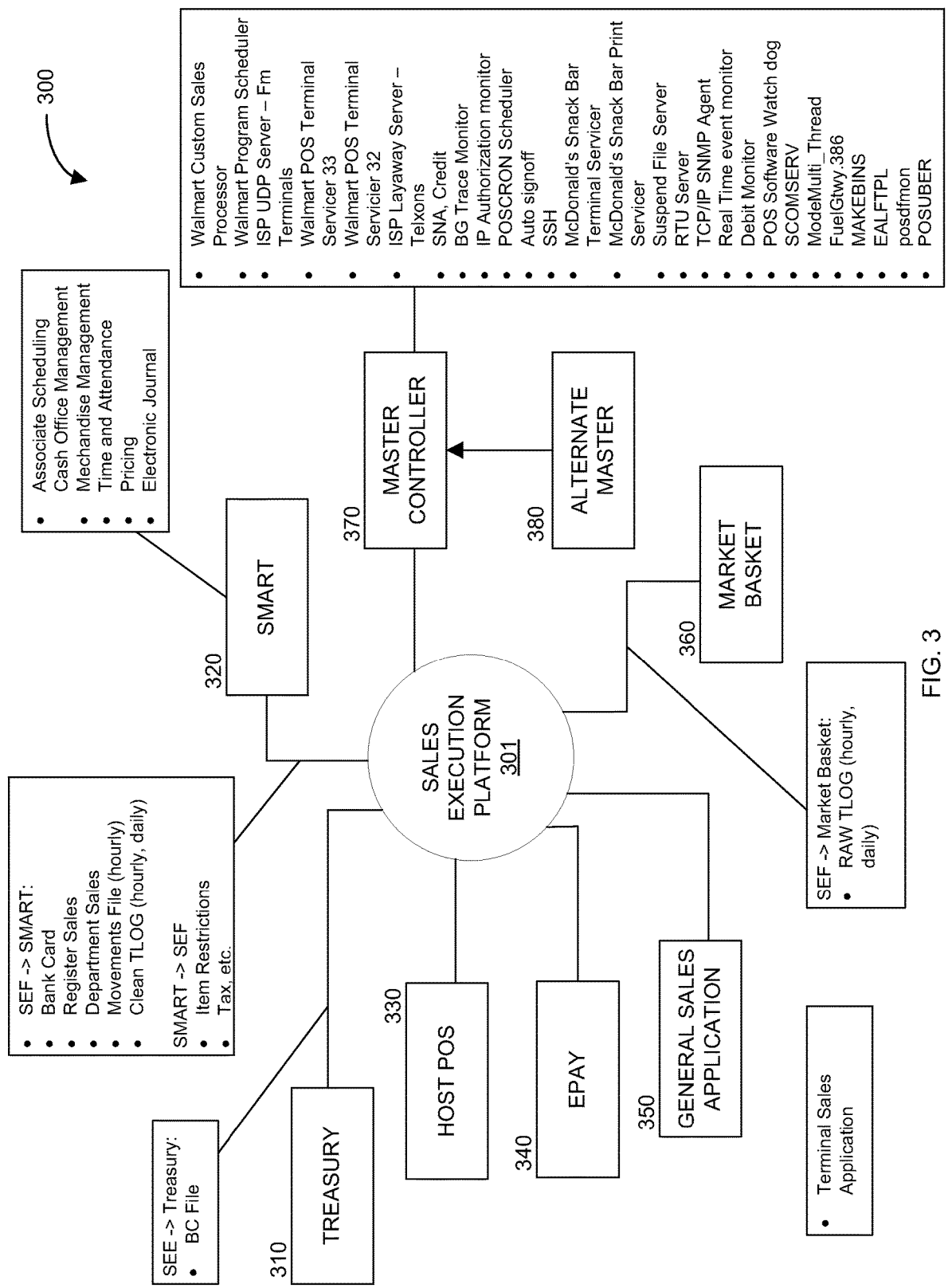
FIG. 3 is a diagram of an exemplary system illustrating the various store systems that co-exist with a sales execution environment, according to an example embodiment.

FIG. 3 is a diagram of an exemplary system 300 illustrating the various store systems that co-exist with the SEE within the SEP 301, according to an example embodiment. The diagram also includes the types of information that is shared with each system. The following store systems described are examples of systems that may co-exist with SEE. Treasury System 310 is a system that handles the end of day settlement process for all types of electronic tenders, such as, electronic payments, check, debit cards, credit cards, and the like. The Treasury System 310 may also route the payment information to corresponding banks. The SMART System 320 is a system in the back office. Each store may have one SMART System 320 that acts as a single point of distribution of data in or out of the store including register sales, department sales, bankcard information, T-LOGs, and the like.

A Host POS System 330 is a system that handles debit authorization, check authorization, item refund, NOF item lookup and associate discounts. EPAY System 340 is a system that deals with electronic payment requests from the registers. The EPAY System 340 is an intermediary between the POS and the payment authorizers. General Sales Application System 350 is a system that controls a variety of point-of-sale terminals. The General Sales Application System 350 Also supports store opening and closing processes and reports. Market Basket System 360 is a system that processes the raw T-LOGs from the stores and feeds other backend systems with information extracted from them. Master Controller (CC) System 370 is a system that controls the terminals and manages the communications with upstream systems. The Master Controller System 370 is an interface to send transaction related data and to receive files needed for transaction execution. The Master Controller System 370 hosts various applications that monitor and enable terminals to complete transactions. Alternate Master (DD) System 380 is a system that is the backup to the Master Controller System 370.

Architecture

The fundamental building blocks of the SEP may be referred to as architectural layers. An architectural layer can further be described by the responsibilities allocated to it. Inside each layer is a set of candidate services that constitute the basic elements of that layer. These candidate services provide the functionality that delivers the responsibility assigned to that layer, depicting the "types of things" that can reside in that specific layer. A candidate service is a self-contained unit of functionality. Multiple candidate services can be combined to provide a larger functionality, for example, execution of a sales-related task that has multiple steps.

Figure 4:
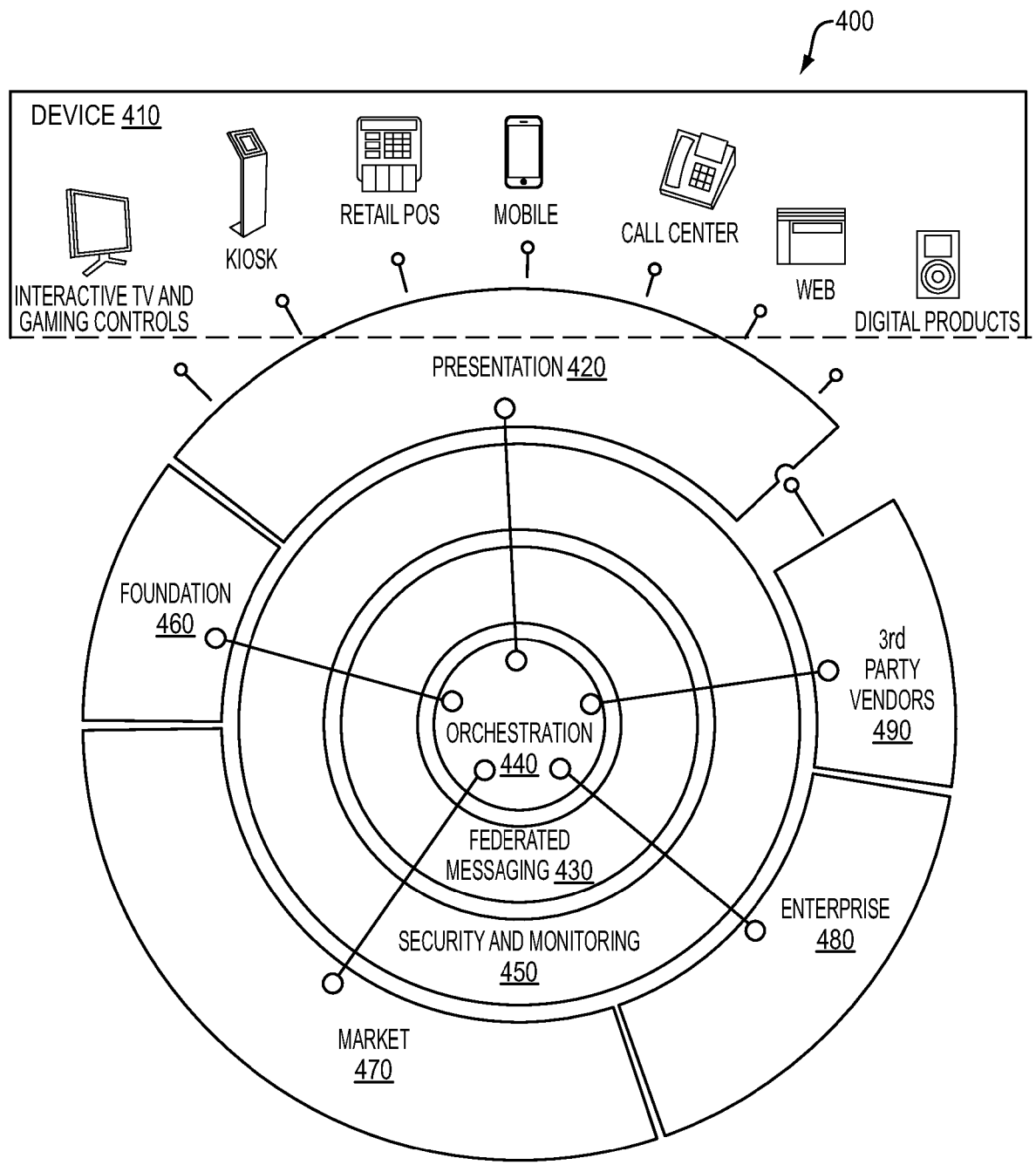
FIG. 4 is a diagram of an exemplary system illustrating the various architectural layers with a sales execution environment, according to example embodiment.

FIG. 4 is a diagram of an exemplary system 400 illustrating the various architectural layers with the SEP, according to an example embodiment. The architectural layers include, but are not limited to, a device layer 410, a presentation layer 420, a federated messaging layer 430, orchestration layer 440, security and monitoring layer 450, a foundation layer 460, a market layer 470, an enterprise layer 480, and a third-party layer 490. Although, FIG. 4 shows system 400 including only these layers, it is understood that there may be more or fewer layers included in system 400, and their names and functions may vary.

The device layer 410 is responsible for enabling interactions between Actors and the SEP to facilitate performance or one or more tasks, services, processes, operations, or functions by the SEP for sales execution, as described herein. The presentation layer 420 is responsible for device-specific rendering and optimization components that enable task delivery. The federated messaging layer 430 is responsible for decoupling service providers and service consumers. This is where infrastructure-enabling components may provide features like brokering, routing and transformation. The orchestration layer 440 is responsible for service invocation, sequencing rules, and event management. The presentation layer 420 candidate services and other candidate services invoke candidate services of the orchestration layer to execute their multi-step tasks. In contrast to hardcoding service interactions, this layer provides engines that help decouple how services interact with each other. The security and monitoring layer 450 is responsible for maintaining the integrity of the data and communications of SEP services.

The foundation layer 460 is responsible for cross-market services and service interfaces, SEP administration capabilities (to configure orchestrations, rules and events) and notification techniques. The market layer 470 is responsible for the market-specific components and services. In this layer Markets can extend or augment SEP for their benefit. The enterprise layer 480 is responsible for leveraging existing enterprise capabilities and services and integrating with operational systems of the enterprise. The third-party layer 490 is responsible for encapsulating third parties from SEP components including vendors, compliance agencies and fiscal entities.

Figure 5:
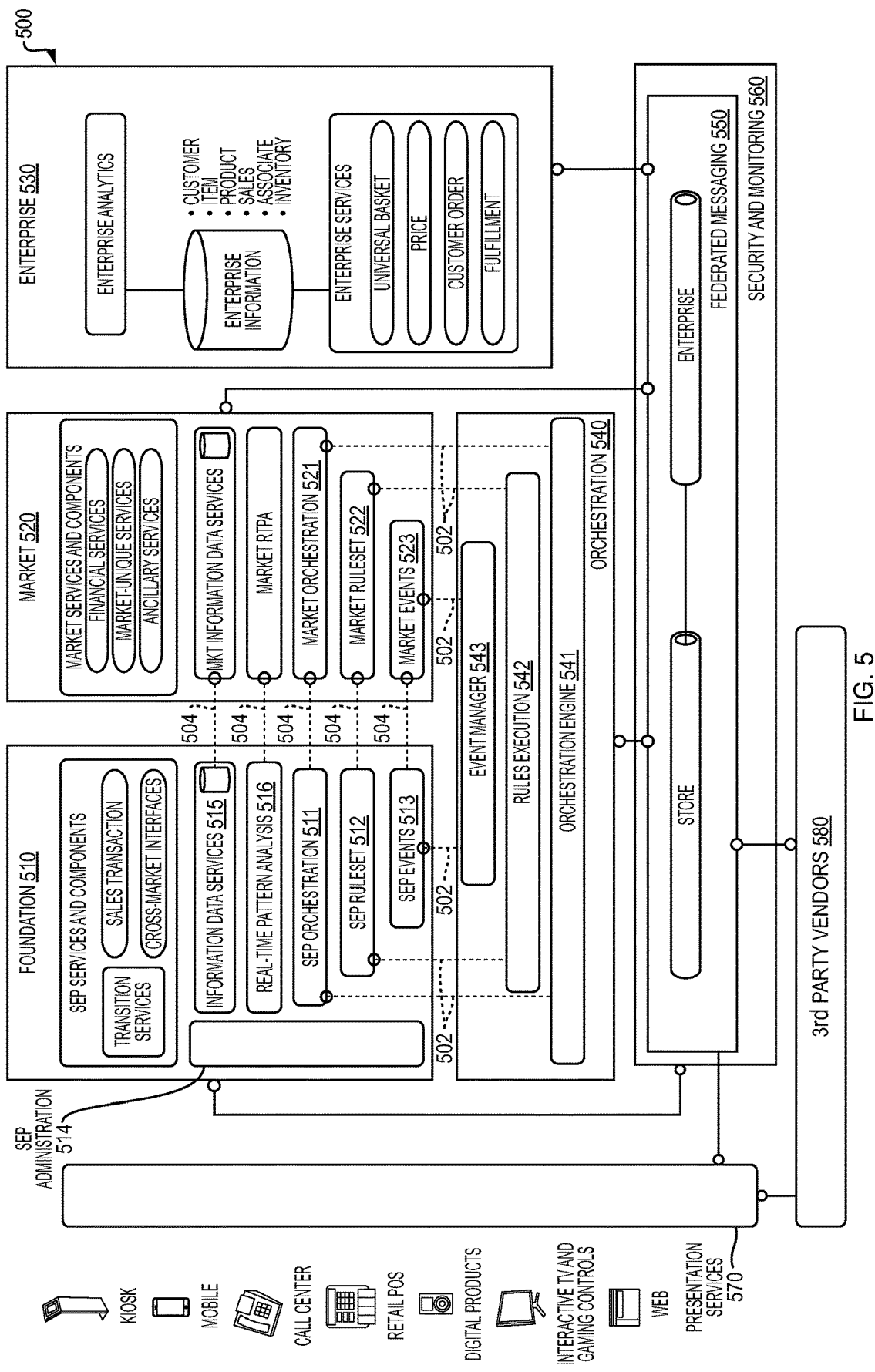
FIG. 5 is a diagram of an exemplary system illustrating various components of the architectural layers of a sales execution environment, according to an example embodiment.

The SEE system is designed so that there is just-enough guidance to operate the system without restricting future possibilities. FIG. 5 is a diagram of an exemplary system 500 illustrating various components of the architectural layers of the SEP, according to an example embodiment. The vertical dotted lines 502 represent configuration. Configuration is the ability to customize the SEP or its layers without changing the running components. As an example in the foundation layer 510, the SEP Orchestration component 511 is shown as configuring the Orchestration Engine component 541 of the orchestration layer 540. Since the foundation layer 510 is responsible for cross-market concerns, this relationship may be interpreted as configuring the cross-market orchestrations. Similarly, the SEP Ruleset component 512 and SEP Events 513 of the foundation layer 510 are shown as configuring the Rules Execution component 542 and the Event Manager component 543 of the orchestration layer 540 respectively.

The horizontal dotted lines 504 represent extension. Extension is the ability to customize the product by enhancing existing configuration or replacing a cross-market component with a market-specific component as long as the interface remains the same. An example of an extension may be adding a market-specific step, such as authenticating a shopping transaction with a fiscal agency, within a cross-market orchestration, such as checkout. Markets have the ability to augment SEP by configuring their own orchestrations, rulesets and events in combination with their own interfaces and components.

The presentation layer 570 is responsible for enabling the consumption of multi-step tasks defined as a collection of features, orchestration and services offered to actors with an intended business benefit. As discussed above, Devices are used by Actors as task-consumption mechanisms and user-experience endpoints. The presentation layer 570 consists of stateless components responsible for supporting device-specific rendering and device-specific optimization. The presentation layer 570 is also responsible for task delivery to specific devices. Other responsibilities include the necessary device adapters to support any peripherals required by the device such as scales, pin pads and keyboards.

The orchestration layer 540 is a single point of contact for the presentation layers 570 to invoke conceptual business services, and coordinate services in support of an activity, such as the orchestration. The orchestration layer 540 can invoke services from any other layers via the Federated Messaging components 550, manage the unit of work as required by the tasks, trigger context-based rules and content-based routing, and raise events based upon rule evaluation. The orchestration layer 540 is dynamically configurable with cross-market and market-specific orchestrations, rulesets and events, and it provides rule archetypes in support of Orchestration and Market components. It is also responsible for handling event subscriptions and notifications. The orchestration layer 540 has the ability to support synchronous (orchestrations) and asynchronous (events) processing, and also support a disconnected mode (store and forward, queueing). Orchestration organizes services, while events are triggers that result in the passing of information from one component to another. For example, a specific set of services are orchestrated together to perform a transaction. The completion of the transaction, for example, may trigger an event that is relevant to other systems and services within the SEP. The Orchestration Engine 541, the Rules Execution Engine 542 and the Event Manager 543 are hosted in the orchestration layer 540.

The federated messaging layer 550 decouples service providers and service consumers. It also provides infrastructure enablement components, such as, integration among Foundation, Market, Enterprise and third-party services, brokering, routing, NFR-based brokering (scaling, capacity, etc.), message transformation, and the like.

The foundation layer 510 provides cross-market orchestrations, service interfaces, services and components. Orchestrations may include, for example, Price Override, Void, Refund, and the like. Service interfaces may include, for example, Payment, Tax (markets would provide the components), and the like. Services and components may include, for example, Shopping Basket, Lane Management, and the like. The foundation layer 510 can also include SEP Administration services 514 that allow markets to customize orchestrations, rules and events. The foundation layer 510 offers persistence via Information Data Services 515, and real-time event pattern analysis 516. Real-time event pattern analysis 516 may include providing support for store management based on various store characteristics, such as, high traffic zones, and providing a recommendation engine that enhances customer experiences by analyzing customer events and suggesting appropriate actions. The foundation layer 510 also provides notification services such as, alerts, reminders, emails, and the like. It also provides transition services that facilitate the migration from legacy POS to future products and architecture, and it is configurable and extensible by markets.

The market layer 520 provides components as required per interfaces defined by the foundation layer 510. A user can implement extensions and augment the SEP via the market layer 520 by adding market-specific orchestrations 521, rulesets 522, and events 523. The market layer 520 allows a user to incorporate market-specific components via SEP Administration 514, and extend or augment SEP data with market-specific data.

The enterprise layer 530 leverages existing enterprise capabilities and services, and integrates enterprise operational systems. It can also provide sales data for historical and periodical analytics. The third-party layer 580 augments the SEP with third-party products such as Ticketmaster, and integrate compliance agencies, fiscal entities, and the like. The security and monitoring layer 560 facilitates user and device authentication, web services security including payload encryption, infrastructure monitoring, capacity monitoring, and traffic re-routing.

Candidate Service Model

The candidate service model may be implemented using a subset of Service Oriented Architecture Modeling Language (SoaML) which is a Unified Modeling Language (UML) profile generally useful for modeling service-oriented architectures. The candidate services may be tagged with SoaML stereotypes, such as, capability, service interface, and artifact. As discussed above, a candidate service is a self-contained unit of functionality, and multiple candidate services can be combined to provide a larger functionality, such as, an execution of a sales-related task.

Capability stereotype represents a candidate service or candidate service family that includes the components that implement the services. In other words, both services and service components are both contained within the same layer. The service interface stereotype represents a service or service family interface. In one embodiment, the layer declaring the service interface may own and be responsible for the governance of the interface, but the component that implements that interface may be outsourced to another layer. For example, a cross-market service interface in the foundation layer, such as the Tax Interface, requires a component in the market layer to deliver the functionality. The artifact stereotype represents concepts like persistence and supplying configuration required by a component such as the rules engine. The candidate services tagged as artifact may not be services per se but they may be important characteristics of the candidate service model.

The orchestration layer may include candidate services, such as, event manager (a central repository of event information), orchestration administration (a facility that allows configuration of orchestrations, rules and events), orchestration engine (an engine that sequences services, evaluates rules, raises events, responds to triggered events), and rules engine. The rules engine is a condition evaluation engine that supports external definition of rules and dynamic definition of rules that facilitate scenarios such as restricting sales of items when a suspect pattern of sales transactions is observed.

Figure 6:
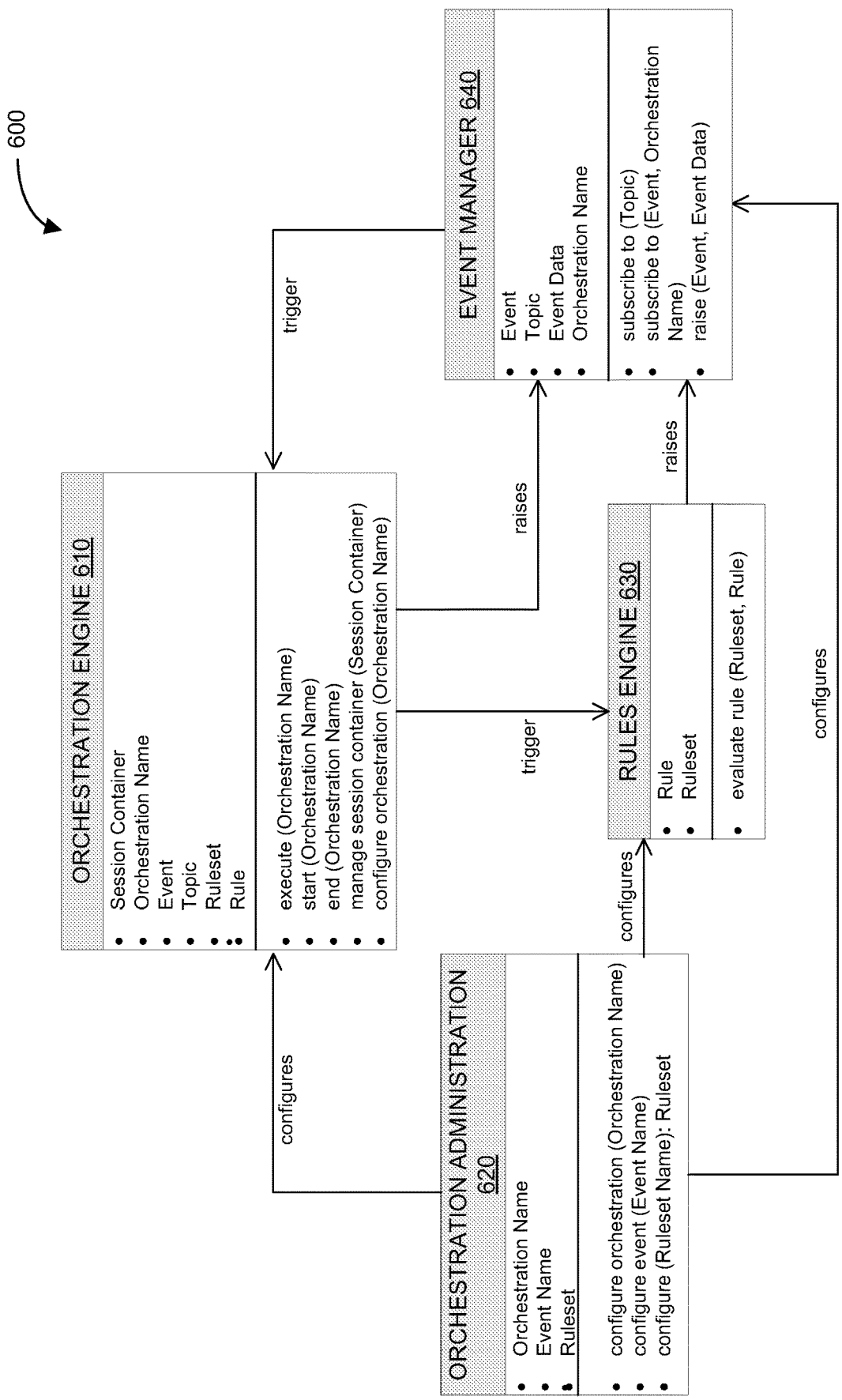
FIG. 6 is a diagram of an exemplary system illustrating various candidate services and their stereotypes of an orchestration layer in a sales execution environment, according to an example embodiment.

FIG. 6 is a diagram of an exemplary system 600 illustrating various candidate services and of the orchestration layer, according to an example embodiment. System 600 may represent the orchestration layer. As shown in FIG. 6, the orchestration layer includes an Orchestration Engine 610, an Orchestration Administration 620, a Rules Engine 630, and an Event Manager 640. FIG. 6 shows the variables and candidate services of each of these components. For example, the Rules Engine 630 consist of a Rule and a Ruleset, and performs the function "evaluate rule" with inputs Rule and Ruleset. The Orchestration Administration 620 configures the Orchestration Engine 610, the Rules Engine 630, and the Event Manager 640. The Event Manager 640 triggers the Orchestration Engine 610, and the Orchestration Engine 610 raises an event in the Event Manager 640. The Rules Engine 630 can be triggered by the Orchestration Engine 610, and raise an event in the Event Manager 640. The Orchestration Engine 610 evaluates the pre-conditions before calling a service.

The Rules Engine 630 can perform or be responsible for various functionalities. These functionalities include specifying a rule associated with a sub-task in a multistep commerce-related task. The sub-task can be implemented as a separate sub-task data structure than other sub-tasks in the multistep commerce-related task and the rule can be implemented as a separate rule data structure than the separate sub-task data structure. When the multi-step commerce-related task is executed, the Rules Engine 630 can trigger the rule in response. The Rules Engine 630 can analyze information generated in response to the execution of the multi-step commerce related task to determine whether the rule has been satisfied. The Rules Engine 630 further determines whether to continue executing the multi-step commerce-related task based on a determination of whether the rule has been satisfied. If the rule has not been satisfied, then the Rules Engine 630 may abort the multi-step commerce-related task, or abort the sub-task associated with the rule.

Triggering a rule may invoke the rule as a separate task within the sub-task. One may modify the rule by changing the rule data structure, and modifying the rule may alter the multi-step commerce-related task without modifying the sub-tasks of the multi-step commerce-related task. Additionally, modifying the sub-task by changing the sub-task data structure to modify the multi-step commerce-related task, may be done without modifying the rule data structure. One example of a rule is where the rule invokes actions or events based on a bin number of a credit card that is used to make a payment or complete a sales transaction. Another example of a rule may prompt an actor, such as a customer-facing associate, via a graphical user interface, to query a customer.

Figure 7:
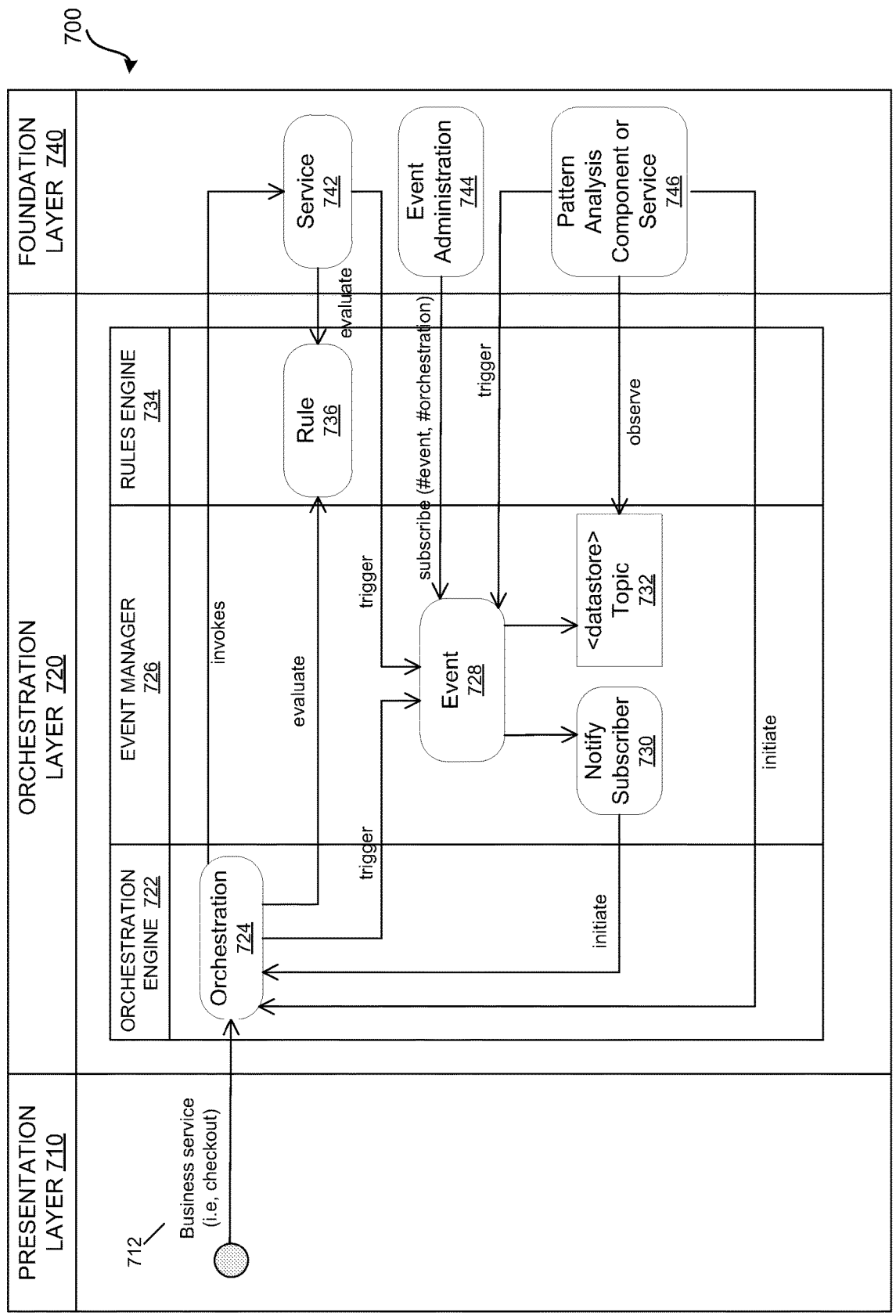
FIG. 7 is a diagram of an exemplary system illustrating interactions between various candidate services of the architectural layers of a sales execution environment, according to an example embodiment.

FIG. 7 is a diagram of a system 700 illustrating interactions between various candidate services of the architectural layers of the SEP, according to an example embodiment. System 700 includes a presentation layer 710, an orchestration layer 720, and a foundation layer 740. The presentation layer 710 invokes an orchestration 724 to perform a multi-step task. An "orchestration" is a mechanism to invoke services in a particular sequence in support of a multi-step task. System 700 in FIG. 7 illustrates orchestration 724 for a checkout task. In one embodiment, orchestrations 724 are configured within the orchestration engine 722. The orchestration 724 invokes various candidate services 742 to fulfill the task. Both the orchestration 724 and the candidate service 742 can trigger an event 728. The event 728 may be configured within the event manager 726. The orchestration 724 may request the rules engine 734 to evaluate a rule. Event administration 744 may subscribe to an event 728, and the event manager 726 may notify the subscriber 730 as discussed below in connection with the push and pull models. The pattern analysis component or service 746 observes a topic 732 and triggers an event 728 when appropriate. The candidate services 742 can be in any layer. Even though FIG. 7 illustrates invocation of a foundation candidate service 742, it should be understood that candidate services of other layers can be invoked. Pre-conditions refer to entities required as inputs to the orchestration steps while post-conditions refer to the required outputs from the orchestration steps. The orchestration engine 722, as having the responsibility to maintain state, tracks these entities in its Session Container.

The rules engine 734 include reconfigurable rules 736 that can be associated with an execution of the services 742, also referred to as sub-tasks, such that the rules 736 can be called in response to execution of the one or more services 742.

The rules 736 can be modified without modifying the services 742 and the service 742 can be modified without modifying the rules 736. Some examples of rules 736 include providing rewards or discounts based on the bin number of a credit/debit card, prompting a cashier to ask a customer if they are interested in purchasing a featured item, rules to handle different payment options. In an example embodiment, the modular implementation of the rules and the services permits modifications of one with affecting the other.

For example, a "get personalized coupons" orchestration may include the following candidate services and conditions:

| Pre Conditions | Service | Post Conditions |
| --- | --- | --- |
| Customer Credentials | Authorization.getIdentityFor( ) | Customer Identity |
| Customer Identity | Customer.lookUpCustomerProfile( ) | Customer Profile |
| Customer Profile | Coupons.getCouponsFor( ) | Coupon[ ] |

One distinction between orchestrations and events is that synchronous activities are handled via the Orchestration Engine 722 while asynchronous activities are handled via the Event Manager 726. Orchestrations 724 can evaluate rules 736 and trigger events 728 as a result. Candidate services 742 can also evaluate rules 736 and trigger events 728. In some embodiments, orchestrations 724 can be multi-threaded so long as there are clear and configurable split and join steps in the orchestration.

In an exemplary embodiment, an Event Manager supports various models of operations. In some embodiments, the Event Manager supports a pull model or a push model. In alternative embodiments, the Event manager supports both a pull model and a push model. The pull and push models are named from the perspective of an event consumer. In an example push model, the Event Manager is responsible for pushing notifications to interested parties. The SEP Administration feature in the foundation layer supports subscription to events. Subscriptions require orchestrations that are invoked upon event triggering. The push model of event notification supports near real-time processing. It is intended to support scenarios where the occurrence of an event requires immediate attention. As such when the Event Manager sees this event, it knows to invoke this orchestration right away.

In an example pull model, the Event Manager is responsible for publishing the event to a topic or a context group. A topic or a context group may be used interchangeably in the present disclosure. A topic or a context group refers to events or groups of events triggered, for example, during a completed sales transaction, such as a sale of a restricted item. Other examples of topics or context group includes events relating to a transaction that resulted in a refund, or a series of successive financial transactions that indicate a possibility of fraud. An event-driven system, such as the SEE, allows for dynamism of such events. Components or candidate services can observe a topic or context group (i.e., pull the event information) and decide whether to invoke orchestrations or trigger additional events. This facilitates requirements like Anti-Money Laundering, Fraud, and the like. The pull model supports asynchronous processing. Event consumption can happen at specified intervals. In some embodiments, event consumption may not occur if there are no observers of a particular topic. The Event Manager's responsibilities end when the event is published to the topic(s). In an example embodiment, an event is kept in a topic for a period of time that may be a configurable parameter. In an alternative embodiment, an event may be in kept in a topic for a predetermined time that is not configurable by users.

The federated messaging layer may include candidate services such as enterprise messaging, federated messaging, message categories, store messaging, and transformation services. The enterprise messaging candidate service includes the messaging components that connect a store to the enterprise such as a data center. The federated messaging candidate service is the messaging interface that encapsulates the Store Messaging and the Enterprise Messaging components. This is a unified interface for service consumption. Service consumers are unaware of the service provider's location (for example, local, store or a data center). All service communications go through this Messaging interface. The message categories candidate service is the classification of messages with considerations for security, affinity to orchestrations, and service level agreements. The message categories may include, but are not limited to, shopper, shopping, catalog, payment, ordering, documents, store, SEP Admin, and general. The store messaging candidate services is the messaging layer that addresses the services that are executed in the store. The transformation service is the layer that translates between a store's standard rule model and various standards used by the vendors.

The foundation layer may include configurations such as SEP Orchestration, SEP Events, and SEP Rulesets, that allow for reconfiguration of foundations services that affect multiple Markets without impacting other services. SEP Orchestration configuration facilitates execution of services in sequential order to complete a unit of work needed by the presentation layer. SEP Events configuration provides asynchronous ability to notify interested parties that a certain service has occurred or a context exists. For example, a customer buys an item that is restricted due to Anti-Money Laundering requirements and it may result in a denial of sale next time that customer makes a purchase. In that case, the SEP Events configuration may notify the cashier that the sale to that customer must be denied. SEP Rulesets configuration provides the ability to apply a set of rules to a specific context of the entities. For example, an attempt to buy an alcoholic item from an underage associate, results in a denial of sale because alcohol cannot be sold by an underage associate. In another example, an attempt to buy alcoholic item on Sunday at a store that is located in a district that does not sell alcohol on Sundays, results in a denial of sale because alcohol cannot be sold at the store on Sundays.

The foundation layer may include the following candidate services described below. SEP Administration service is the ability to create unique settings for orchestrations, events and rules within the context of the entities that have been declared. Cash Office service refers to the operational area of the store which deals with all sales transactions and payments to assure compliance with store policies. Item service handles the goods or services that are sold to customers through suppliers. Shopping Basket service is the collection of items the customer is looking to purchase and which has some level of assurance that a sale can be completed. Real-time Pattern Analysis service is the ability to identify a sequence or collection of events and initiate an orchestration to meet the needs of the business.

Notification service is responsible for the delivery of a message to an associate or customer. Sales Transactions service is the purchase of merchandise from the store, which the customer is taking delivery of at the moment. Audit service is the tracking of actions which can later be used as proof of compliance. SEP Information Data Services are persistence services used to assure all information is not lost if the system fails. Reports services is information used by management to support business decisions. Lane Management service is the tracking of the queue depth in each lane to assure stores are providing customers with a satisfactory shopping experience. Device Management service is the tracking of devices used in the store by associates and the unique collection of devices needed by the associates to perform specific tasks. Store services is the location where the store does business with its customers. Document Generation service is the ability to print a receipt or third-party documents needed by customers.

The market layer may include such as market orchestration, market events, market rulesets, and the like, that allow customizations for market-specific behaviour without code changes. Market orchestration is market specific execution of services in a sequential order to complete a unit of work needed by the presentation layer. Market events refers to a market's asynchronous ability to notify interested parties that a certain service has occurred or a context exists. For example, a customer buys an item that is restricted due to Anti-Money Laundering requirements which may result in a denial of sale next time that customer makes a purchase. In this case, market events notifies the cashier that the purchase must be denied for that customer. Market rulesets refers to a market's ability to apply a set of rules to a specific context of the entities. For example, an attempt to buy an alcoholic item from an underage associate, results in a denial of sale because alcohol cannot be sold by an underage associate. In another example, an attempt to buy alcoholic item on Sunday at a store that is located in a district that does not sell alcohol on Sundays, results in a denial of sale because alcohol cannot be sold at the store on Sundays.

The market layer may facilitate the following SEP extensions described here. Payment extension is a record of the use of a payment instrument to complete the sales transaction for merchandise. Availability extension is the query of inventory needed to assure a store's ability to complete a purchase from the customer. Market Data Services extension is the ability to persist market information despite the failure of the system. Market Data extension is the information needed by market services to complete the unit of work needed by the business. Tax extension is the tax that is collected for the sale based on specific government jurisdictional regulations, and may be based on multiple jurisdictions (city, county, state, federal, export, VAT, etc) and may include multiple taxes on merchandise (sales tax, soda tax, etc). Fee extension is the charge on purchasing an item that reflects the cost of activities associated with the purchase that local governments engage in. Fee extensions often reflect things like local disposal of batteries which occur as a result of a purchase.

Coupon extension is the ability to support reducing the cost of an item to the consumer through a manufacturer reimbursement. Discount extension is the reduced amount being charged for an item because of some promotional event. For example, the promotional event may be an associate discount. Store Task extension is a unit of work that needs to be assigned and completed by an associate in a specific timeframe.

The market layer may also include the following candidate services described here. Bill Pay service is the collection of payment for the purpose of completing the debt obligation of a consumer and a vendor. Fuel service is the service that collects payment for specific fuels and number of gallons (or liters) of fuel purchased. Pension/Retirement Account service are the services which allow customers to withdraw money and check the balance of a customer pension account. Check Cashing service is the service that handles payout of a check against a specific bank account. Currency Exchange service is the service that allows a customer to exchange one set of currencies for another set of currencies. Bank Account service is the consumer account where the money is stored for later use in purchases. Store service is the specific store services needed by local markets to stay competitive in the business.

The enterprise layer may include the following candidate services described here. Customer Profile service handles the preferences a specific customer may have opted into that enables a store to create value in their sales experience with the store. Customer Account service is the record of the service or agreement to do business. Prospect service relates to future customers that the store wants to encourage to shop at the store. Membership service is the service which allows a customer to purchase merchandise at a club store, where a customer must be member to shop. Address service is the postal location where mail is delivered to. Authorization service is the service which takes a credential used to identify a person and authorizes them to use a resource. List service is the service around managing a collection of items. Gift Card service handles the special payment type in which money has been given as a gift to enable a desired purchase.

Workforce service is the collection of associates who assist in carrying out the store business. Complaint service is the formal declaration of an issue that needs to be addressed. Catalog service is the collection of products and hierarchies to enable presenting the assortment of merchandise for sale. Restriction service is the sales or payment restriction that specifies what can be purchased with what types of payments. Recommendations service is product selections the customer may be interested in based on prior comments from other customers. Item service is the merchandise to be purchased which can be either a good or a service. Price service is the cost of an item to a consumer. Claims services is the vendor reimbursements stemming from a customer return or damage merchandise which can no longer be sold. Inventory service is a list of merchandise and quantities that are available to be sold.

Private Label Credit Account service are services around providing credit to customers for purchases with the store. Returns service are services around returning an item and receiving a refund. Money Transfer service are services around collecting money at one location and delivering it at another location for a specific person. Universal Basket service is a collection of merchandise the consumer wishes to purchase, independent of the specific channel the merchandise is fulfilled through. Customer Order service are services around selling merchandise from supply chains and delivered as they desire.

Component Model

Figure 8:
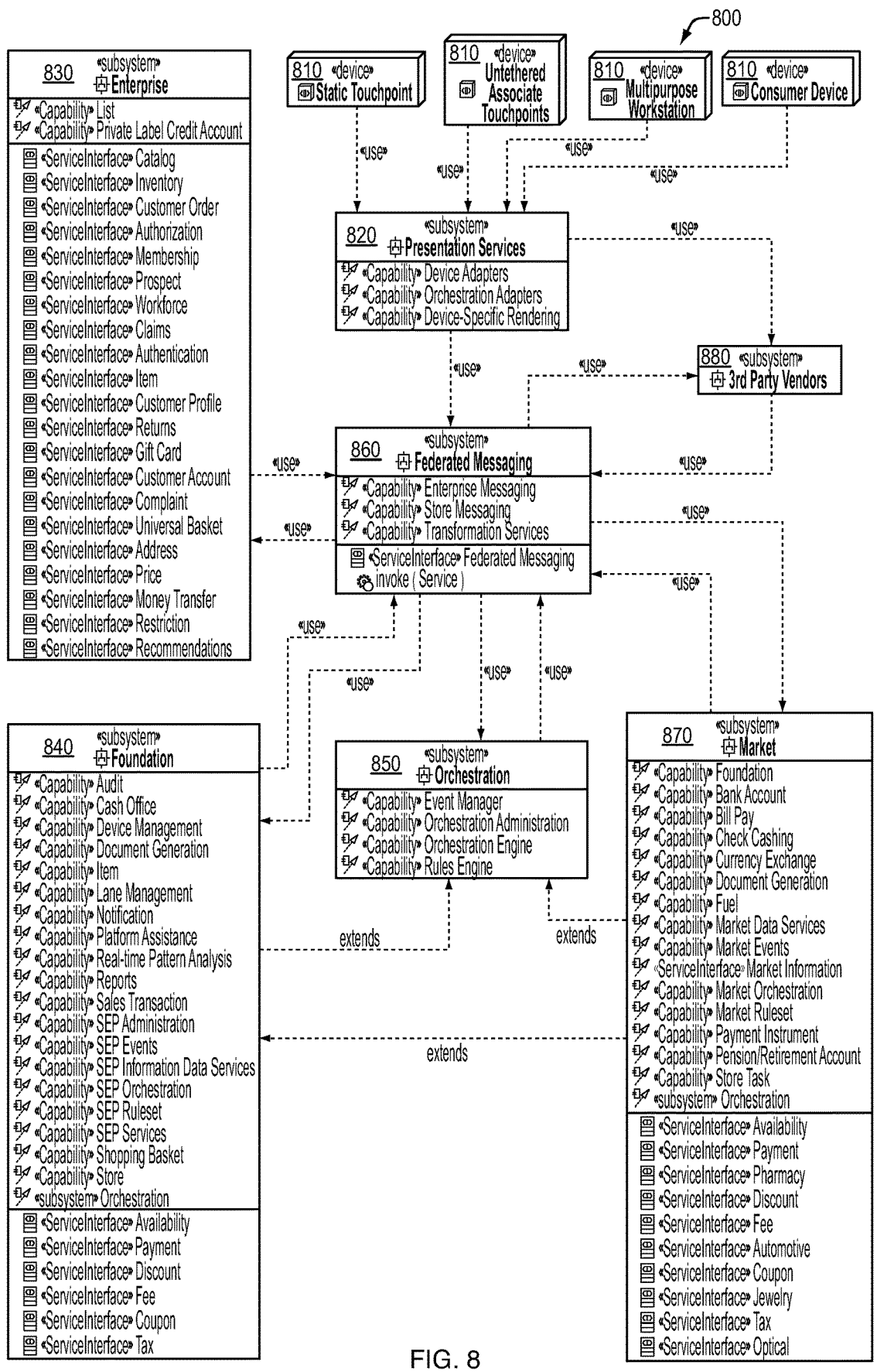
FIG. 8 is a diagram of an exemplary system illustrating an example component model and interactions and dependencies between each layer of a sales execution environment, according to an example embodiment.

In some embodiments, a component model is used to implement the functionalities of the SEP. The component model facilitates structure and modularity of various software components. It aides designers and developers in understanding the high level system design. Each architectural layer is tagged with a "subsystem" stereotype. FIG. 8 is a diagram of an exemplary system 800 illustrating an example component model and the interactions and dependencies between each layer, according to an example embodiment. As shown in FIG. 8, system 800 includes various architectural layers, discussed herein, tagged as subsystem stereotype. These layers may include a presentation layer 820, an enterprise layer 830, a foundation layer 840, an orchestration layer 850, a federated messaging layer 860, market layer 870, and third-party layer 880. The architectural layers include capabilities and/or service interfaces as discussed above. System 800 also includes devices 810 that mainly interact with the presentation layer 820. The arrows illustrate the interactions between the layers.

Component Interactions

The following description discuss example high-level interactions from an end user perspective. Security measures, such as encryption and secure protocol, are implemented as appropriate, even though these measures are not specifically discussed in connection with the example interactions below.

Figure 9:
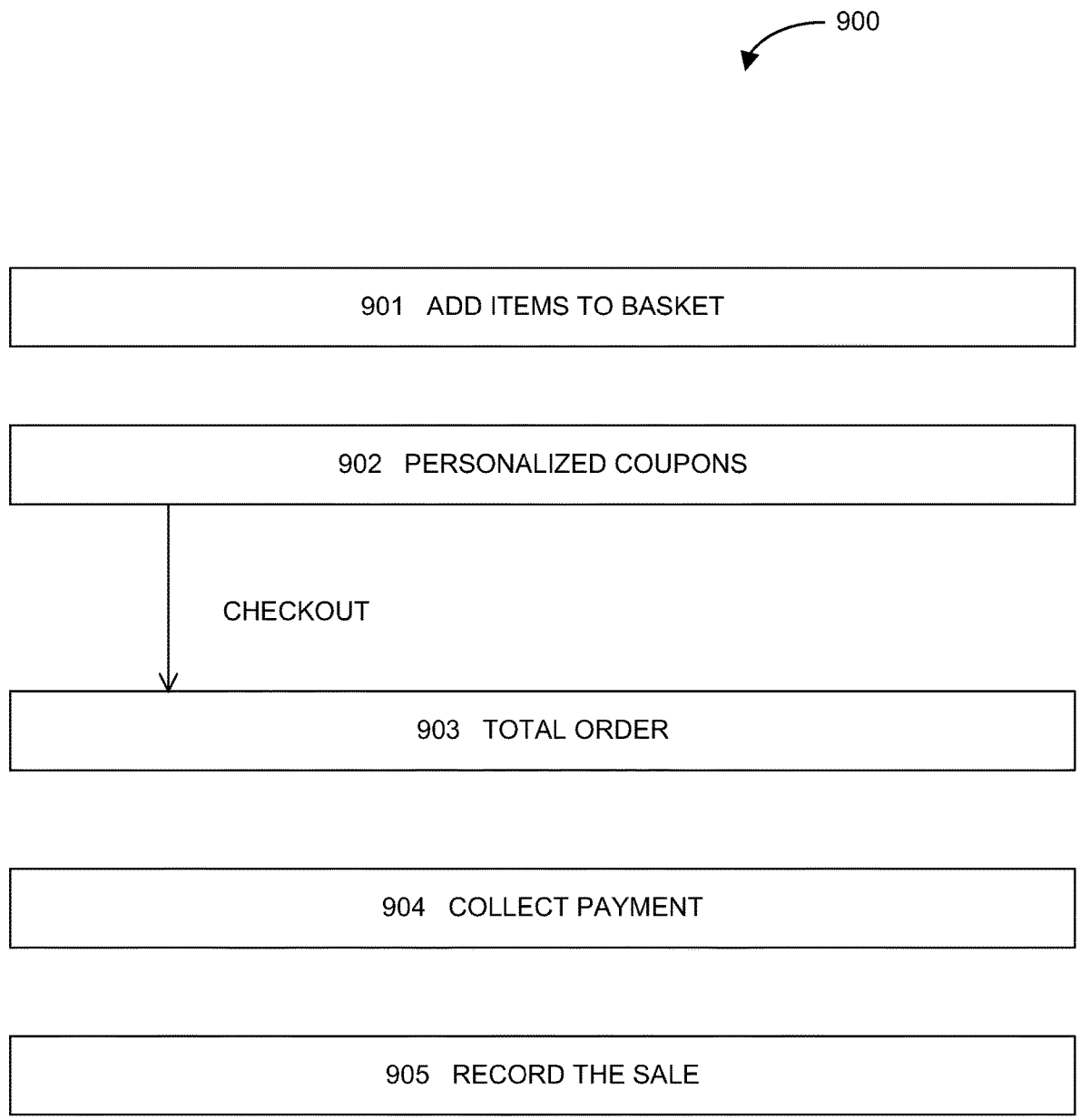
FIG. 9 illustrates components configured to perform a sales process within a sales execution environment, according to an example embodiment.

FIG. 9 illustrates computational components 900 configured to perform a sales process within the SEE, according to an example embodiment. Components 900 include various components that perform the necessary steps to complete a sale. These components are Add Items to the Basket 901, Personalized Coupons 902, Total Order 903, Collect Payment 904, and Record the Sale 905. Some of these components may be triggered by a "Checkout" request from a customer device or a customer-facing associate device.

Figure 10:
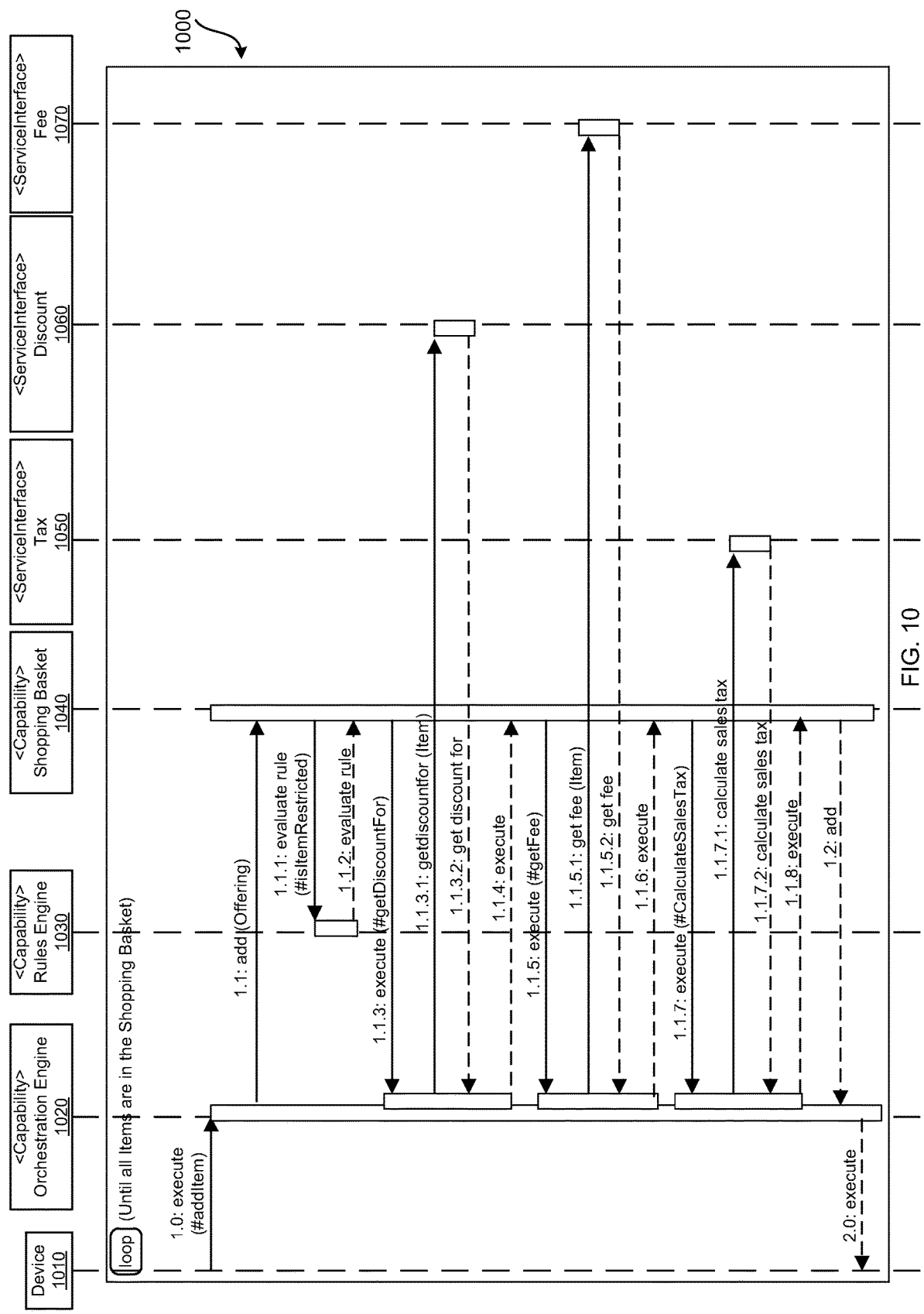
FIG. 10 is a chart of an exemplary process illustrating the "Add Items to the Basket" component of the high-level sales process in a sales execution environment, according to an example embodiment.

FIG. 10 is a chart of an exemplary process 1000 illustrating the "Add Items to the Basket" component of the high-level sales process illustrated in FIG. 9, according to an example embodiment. The lines illustrate the sending and receiving entities for information and requests. The solid lines represent requests for execution of a step or performance of appropriate actions. The dotted lines represent a response to the request signaling that the execution or performance is completed.

Process 1000 begins with a device 1010 requesting to add an item by initiating "execute (#addItem)," where #addItem is the item to be added. This request is forward to the Orchestration Engine 1020, which orchestrates the appropriate components and candidate services to complete the "execute (#addItem)" 1.0 request. The Orchestration Engine 1020 forwards "add (Offering)" 1.1 to capability Shopping Basket 1040. While executing "add (Offering)" 1.1, a rule is triggered. Shopping Basket 1040 forwards "evaluate rule (#isItemRestricted)" 1.1.1 to capability Rules Engine 1030, where #isItemRestricted is the rule to be evaluated. The #isItemRestricted rule can be used to determine whether an item in the Shopping Basket 1040 has any sales restrictions and whether the sales restrictions have been satisfied. For example, the sale of an item can be restricted based whether the customer has satisfied a minimum age requirement for the item, whether the customer has a prescription for the item, whether the customer has a permit for the item has a permit, or may be restricted for other reasons. Rules Engine 1030 executes "evaluate rule" 1.1.2 with input #isItemRestricted, and forwards the result to Shopping Basket 1040. Shopping Basket 1040 realizes the next step is to "execute (#getDiscountFor)" 1.1.3, and forwards the request to the Orchestration Engine 1020. In response, the Orchestration Engine 1020 initiates the appropriate orchestration. In this case, the Orchestration Engine 1020 calls the service interface Discount 1060, and forwards "getdiscountfor (Item)" 1.1.3.1, where Item is the item for which the discount is to be calculated. The service interface Discount 1060 completes the request and forwards the output to the Orchestration Engine 1020. The Orchestration Engine 1020 then forwards an "execute" 1.1.4 request to Shopping Basket 1040, which lets the Shopping Basket 1040 know to continue its process and that the previous request "execute (#getDiscountFor)" 1.1.3 has been completed. In some embodiments, the Orchestration Engine 1020 may also forward the output of the completed request, in this case, the discount for the item, to Shopping Basket 1040. The next step according to Shopping Basket is "execute (#getFee)" 1.1.5. This request is forwarded to the Orchestration Engine 1020, and in response, the Orchestration Engine 1020 calls the service interface Fee 1070 and forwards the request to it. Service interface Fee 1070 completes the request and forwards the output 1.1.5.2 to the Orchestration Engine 1020. The Orchestration Engine 1020 then forwards an "execute" 1.1.6 request to Shopping Basket 1040, which lets Shopping Basket 1040 know that the request "execute (#getFee)" 1.1.5 has been completed. In some embodiments, the Orchestration Engine 1020 may also forward the output of the completed request, in this case, the fee for the item, to Shopping Basket 1040.

The next step according to Shopping Basket 1040 is "execute (#CalculateSalesTax)" 1.1.7. Shopping Basket 1040 forwards this request to the Orchestration Engine 1020, which in response, calls service interface Tax 1050 and forwards the request 1.1.7.1 to it. Service Interface Tax 1050 completes the request and forwards the result to the Orchestration Engine 1020. The Orchestration Engine 1020 then forwards an "execute" 1.1.8 request to Shopping Basket 1040, which lets Shopping Basket 1040 know that the request "execute (#CalculateSalesTax)" 1.1.7 has been completed. In some embodiments, the Orchestration Engine 1020 may also forward the output of the completed request, in this case, the tax for the item, to Shopping Basket 1040. All steps being completed, Shopping Basket 1040 forwards "add" 1.2 to the Orchestration Engine 1020 letting it know that step "add (Offering)" 1.0 is completed. The Orchestration Engine 1020 forwards "execute" 2.0 to device 1010 letting it know that the request "execute (#addItem)" 1.0 is completed.

Similar to the "Add Item to the Basket" component, the other components of the high-level sales process shown in FIG. 9 execute various functions by interacting with various layers, candidate services, and service interfaces to deliver the a part of the sales process. For example, the "Record the Sale" component begins by requesting the Orchestration Engine to "execute (#recordTheSale)." The Orchestration Engine initiates the appropriate orchestration, where the first step is to "print receipt." The "print receipt" request is sent to capability Sales Transaction. Sales Transaction requests the Orchestration Engine to initiate the appropriate sub-orchestration for "print receipt." The first step of the sub-orchestration routine is to request "create (#localReceiptTemplate, Sales Transaction, xml)" to capability Document Generation. Document Generation sends back "create" to the Orchestration Engine letting it know that it has completed the request. The Orchestration Engine sends an "execute" signal to the Sales Transaction letting it know that it has completed the "execute (#printReceipt)" request. Sales Transaction sends a "print receipt" signal to the Orchestration Engine letting it know that it has completed the "print receipt" request. Since all steps are completed in the orchestration, the Orchestration Engine sends a "execute" signal to the requesting entity letting it know that it has completed the "execute (#recordTheSale)" request.

In this manner, the Orchestration Engine is responsible for initiating the appropriate orchestration based on the request from an entity. The initiated orchestration may include sub-orchestrations within it that the Orchestration Engine is responsible for orchestrating so that the request is completed. As the above discussion illustrates, to complete the request "execute (#recordTheSale)" the Orchestration Engine has to orchestrate "print receipt" which includes orchestrating a sub-orchestration "create (#localReceiptTemplate, Sales Transaction, xml)." After each orchestration is completed, the completing component sends a signal back to the requesting component that it has completed the steps in the orchestration. Referring back to the "Add Items to the Basket" component, the main orchestration orchestrated by the Orchestration Engine is "add (Offering)," which required the orchestration of sub-orchestrations such as "execute (#getDiscountFor)," "execute (#getFee)," and "execute (#CalculateSalesTax)" as requested by the capability Shopping Basket.

Persistence Model

The persistence model refers to a model that dictates where the transaction 'lives,' or is stored or active, while other components and systems are acting upon on it or interacting with it. This model also dictates which component or system is responsible for and tracking data during the occurrence of a transaction. In some embodiments, the orchestration engine is responsible for tracking data, however, the data may need to be persisted or made available at a product instance level or a service level. Traditional POS systems focus on transacting sales while providing customer experiences such as convenient payment choices and fast checkout. One of the benefits of the SEE is the expansion from mere 'purchasing' to inclusion of 'shopping' by providing capabilities beyond payment and checkout. Such capabilities may exert greater influence on the overall shopping experience and enable techniques such as up-sell, cross-sell, omni-channel, endless aisle, social connections for recommendations, and others. Up-sell refers to a sales technique whereby a seller induces a customer to purchase more items, upgrades, or add-ons in an attempt to make a more profitable sale. Up-sell often involves marketing more profitable services or products and can also include exposing the customer to other options that he or she may not have considered. Cross-sell refers to a technique involving selling among or between clients, markets, traders, and the like. It may also refer to the practice of selling an additional product or service to an existing customer. Omni-channel selling refers to the technique of influencing customer experience through all available shopping channels, such as, mobile devices, computer devices, brick-and-mortar stores, television, radio, postal mail, and the like. In omni-channel technique, a customer may use all channels of shopping simultaneously, and the seller may track the customer's activities across all channels. Endless aisle refers to the concept of using in-store kiosks to allow customers to order products that may not be able in that particular store.

Figure 11:
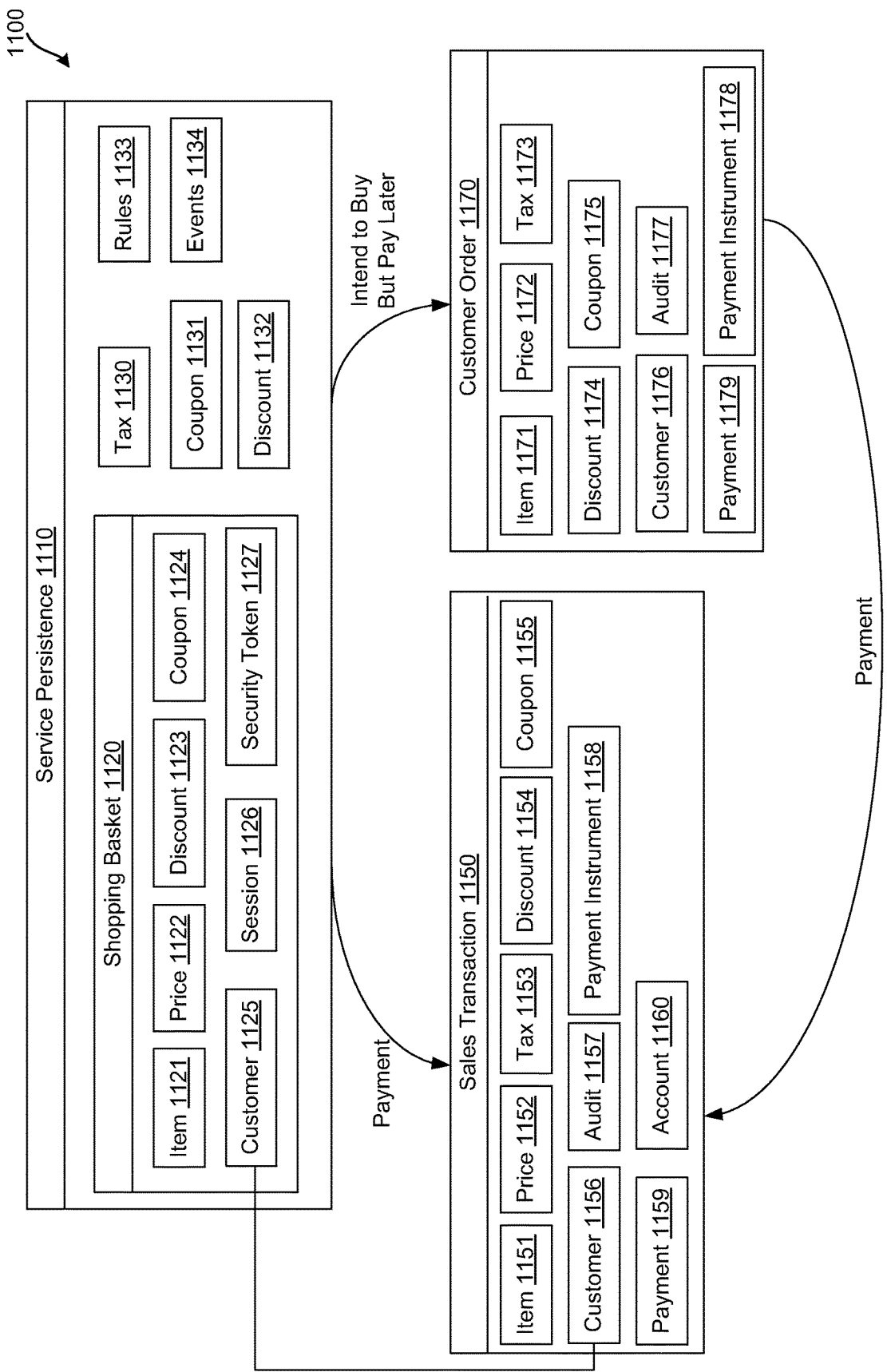
FIG. 11 is a diagram of an exemplary system illustrating a persistence component model of a sales execution environment, according to an example embodiment.

To implement the expansion to shopping, in an example embodiment, the SEE consists of a persistence component model. The persistence component model is based on three major notions: Shopping Basket 1120, Customer Order, and Sales Transaction. FIG. 11 is a diagram of an exemplary system 1100 illustrating a persistence component model, according to an example embodiment. The Shopping Basket 1120 is a container of persistent entities that may be passed to and from SEP instances as well as to and from integrated systems while payment has not occurred. In one embodiment, the SEE, regardless of the origins of the Shopping Basket 1120 itself, can accept a basket, total it, collect payment and record the sale. The Shopping Basket 1120 along with Events 1134, Rule 1133, Tax 1130, Discount 1132 and Coupon 1131 are the concern of Service Persistence 1110. In particular, these entities cover persistence needs during shopping activities such as adding items to the basket, calculating discounts based on the items in the basket and transferring a Shopping Basket 1120 from one device to another. For example, a customer may use a Smartphone to scan items and pay for them at a self-checkout register. As services collaborate during a shopping orchestration they may share or exchange a Shopping Basket 1120.

Shopping Basket 1120 contains the Items 1121 along with their Price 1122 at the time the Item 1121 is added to the Basket 1120. In an example embodiment, the price may expire after a reasonable price expiration period. In a Shopping Basket 1120, Items 1121 may not affect inventory levels because the customer has not yet purchased the Items, but has only expressed the desire to purchase the Items 1121. However, the Items 1121 in the Basket 1120 may carry with it an availability-to-promise function through a specific fulfilment node. An availability-to-promise function provides a response to customer order inquiries based on resource availability. Shopping Basket 1120 is uniquely identified by their Session 1126, Security Token 1127 and/or Customer entities 1125, with Customer 1125 being an optional entity to accommodate a Shopper purchasing without Customer Credentials. As compared to Sales Transactions 1150 and Customer Orders 1170, Shopping Baskets 1120 are temporary. The Shopping Basket 1120 is no longer needed once the payment or intent-to-pay event takes place because when a payment is made, a Shopping Basket 1120 is used to record a Sales Transaction 1150. When the customer declares an intent to buy but defers payment, the Shopping Basket 1120 is used to create a Customer Order 1170, thus, eliminating the Shopping Basket 1120. Furthermore, Shopping Baskets 1120 contain Prices 1122 which may fluctuate, and consequently, they expire if payment or a commitment to pay does not occur after some reasonable period of time.

Discounts 1123 and Coupons 1124 may be applied as Items 1121 are added or removed from the Shopping Basket 1120. However, during the totaling of the basket they may be re-evaluated for their applicability and validity. Calculating the total of the Shopping Basket 1120 may occur at any point in time and not just at the time of payment. Rules 1133 may also be applied, but not enforced, as Items 1121 are added to the Shopping Basket 1120. Rules 1133 may only be enforced at the time of checkout. Various services may collaborate with Event Manager as either event producers or event consumers. Events 1134 decouple services during the sales activities and improve customer experience. For instance, a service adding an item to the basket by scanning can trigger the start-scan and end-scan events. Another service that measures device performance can calculate and record the elapsed time between the start and end scan events, and yet another service that measures store performance can aggregate the elapsed times across all scanners to determine device efficiency. By not waiting for the consuming services to do their work, the triggering service can provide a better customer experience.

Customer Order 1170 is created from Shopping Basket 1120 when Customer 1125 expresses intent to buy but defers payment, or when a Shopping Basket 1120 contains Items 1121 that are to be fulfilled outside of the store. Taxes 1130, Discounts 1132, and Coupons 1131 are applied at the time this transition takes place. Unlike Items 1121 in the Shopping Basket 1120, Customer Order 1170 affects inventory levels because there is a commitment to fulfil the Customer Order 1170 in exchange for a commitment to pay for the Items 1171. There are additional entities that are tracked with Customer Order 1170. First, the Audit entity 1177 represents a permanent record of a business event of interest, such as confirmation that a restricted item met the appropriate criteria at the time of payment. Second, Payment Instrument 1178 and Payment 1179 are tracked with Customer Order 1170 either when a partial payment is made (i.e., a layaway scenario) or when a full payment takes place. In contrast to Shopping Basket 1120, Customer Order 1170 is a permanent record. As such, they support the ability to track Customer Order history. Customer Order 1170 supports the ability of adding Items 1171, removing unpaid items and returning/refunding paid items. As such, Customer Order 1170 is said to be mutable.

Sales Transaction 1150 is the final, permanent representation of a sale. Consequently, ownership of the items in the basket is transferred to the Customer 1156 at the time of the transaction. Sales Transaction 1150 also tracks pertinent information about the sale such as Associate, Store, Lane, Register, and the like. Like Customer Order 1170, Sales Transaction 1150 decreases inventory and supports the ability to track history. Unlike Customer Order 1170, Sales Transaction 1150 is immutable—once recorded it cannot be altered.

Store Deployment

Store deployment profiles refer to the different ways instances of the SEP and SEE are made available to the Actors. Devices within the SEE have a degree of connectivity required to operate as well as a thickness of the device. The degree of connectivity refers to how much work a device needs to support when disconnected from a network (enterprise or store). The thickness of the device refers to the services and components that need to be deployed onto a device, including dedicated hardware, to deliver the sales-related tasks to an actor. Based on these characteristics, various deployment profiles may be available within the SEE. In an example embodiment, at least nine deployment profiles are available. These profiles may include Brazil POS, Assisted Checkout, Self-Checkout, ASDA Popup Store, Vending Machine, Mobile Single-Channel, Mobile Multi-Channel, Cloud Popup Store, and Cloud Register.

While some devices may be designed to work offline (as is the case with the Brazil POS), many others may support varying levels of operation in a disconnected mode for varying reasons. Based on services and component locations stemming from these requirements, the deployment profiles may span over four deployment zones, such as Device (any profile shown in this zone implies some presence of components and services on the device itself), Store (profiles in this zone implies presence of components and services on the store network/infrastructure), Enterprise (profiles in this zone implies presence of components and services on the enterprise network/infrastructure), and External (profiles in this zone implies presence of components and services on a network/infrastructure outside the enterprise).

Some of these profiles require store-and-forward capabilities that allow for processing sales transactions locally (i.e., the device) and later synchronizing them back to the store. Store-and-forward support may be the responsibility of the Federated Messaging Layer, implying that some messaging components may need to be deployed on the device. Synchronization can be enabled by, for instance, Device Management Services at the store initiating an orchestration upon detecting a check-in event from the Device.

Figure 12:
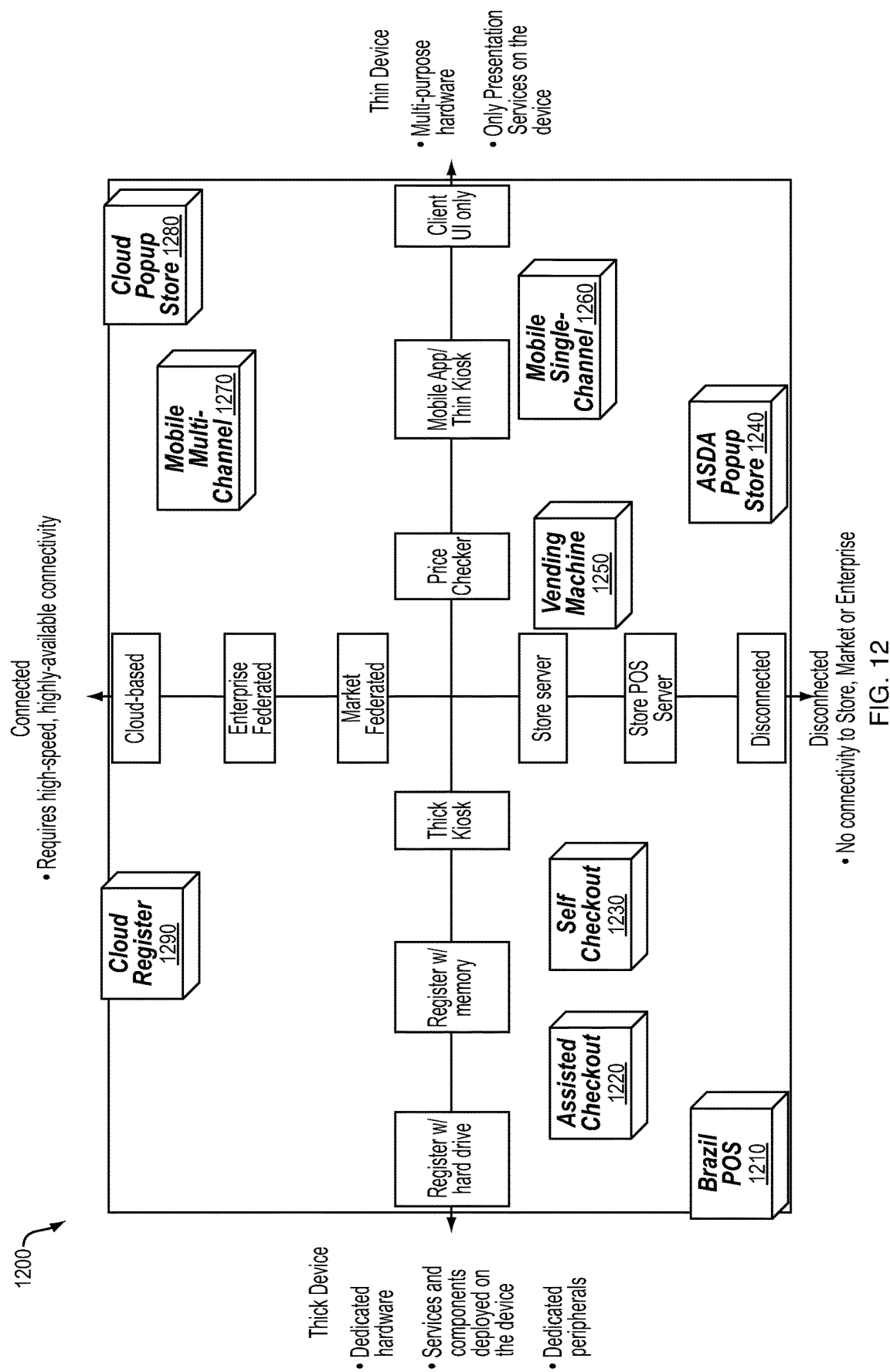
FIG. 12 is a chart illustrating the various deployment profiles within four deployment zones in a sales execution environment, according to an example embodiment.

FIG. 12 is a chart 1200 illustrating the various deployment profiles within four deployment zones based on a degree of connectivity and thickness of the device, according to an example embodiment. Some profiles are shown as covering multiple deployment zones to recognize the potential need to deploy services locally for performance reasons. For example, an enterprise service like Price may be deployed at the Store to avoid the latency inherent with communications to the global data centers. As shown in FIG. 12, the deployment profiles may include a Brazil POS profile 1210, an Assisted Checkout profile 1220, a Self-Checkout profile 1230, a ASDA Popup Store profile 1240, a Vending Machine profile 1250, a Mobile Single-Channel profile 1260, a Multi-Channel profile 1270, a Cloud Popup Store profile 1280 and a Cloud Register profile 1290.

The Brazil POS 1210 can be a deployment profile specific for POS terminals in Brazil. The Brazil POS 1210 deployment profile includes store-and-forward capabilities, and compile-time orchestration is built into the software package (s) running on the device. Because this deployment profile is capable of limited sales transactions even when a device is disconnected from the store, many of the components are deployed in both the Device and the Store. The normal mode of operation, assuming performance criteria is acceptable, is connected to the store. Failover mode is to the device components. While the Brazil POS 1210 deployment profile is described herein as a non-limiting example, those skilled in the art that deployment profiles can be created for other countries, regions, towns, states, cities, or any other geographical areas.

The Assisted Checkout 1220 and Self-Checkout 1230 deployment profiles represent common POS devices at the checkout lane. Both are similar in operational characteristics but each profile supports a different set of tasks and device peripherals. These profiles support dynamic configuration of orchestrations to allow adaptability with minimal disruption to store operations. However since these devices need to be able to complete Sales Transactions even in case of outages, configuration changes need to be made centrally (at a Store server for example) and then pushed out to the devices. This requires collaboration between SEP Administration and Device Management services. Local deployment and co-location of Orchestration, Foundation and Market services is likely in these profiles. In some embodiments, these profiles may include store-and-forward capabilities in support of failover scenarios.

The ASDA Popup Store deployment profile 1240 includes compile-time configuration and is designed to run limited sales transactions while disconnected. In this profile, services and data deployed on the device require that the device downloads any data needed to operate the device prior to leaving the store (for example, catalog and pricing information). Local deployment and co-location of Orchestration, Foundation, Market and Enterprise services may be required to the extent demanded by the sales-related multi-step tasks in the Product Instance. This profile also includes store-and-forward capabilities. The ASDA Popup Store profile 1240 is one of the lightest profile, in terms of infrastructure. It relates to situation, for example, where a user is able to use the SEE on a network connected device within an empty building, without any other infrastructure available to the user.

The Vending Machine deployment profile 1250 is representative of a common kiosk at the store. This profile includes compile-time orchestration for single-purpose devices designed around a limited set of orchestrations and products. Dynamic orchestration for multi-purpose kiosks may be included. Store-and-forward capabilities are included to support services and components deployed on the device for disconnected operations. In some embodiments, this profile may include local deployment and co-location of Orchestration, Foundation, Market and Enterprise services. Furthermore, this profile may be integrated with Enterprise or Third-Party Services.

The Mobile Single-Channel 1260 and Multi-Channel 1270 deployment profiles include compile-time orchestration. These profiles are similar, except for the Multi-Channel profile represents a superset of tasks supported by the Single-Channel profile, and the Multi-Channel profile may access more Enterprise Services than the Single-Channel profile. Furthermore, the Multi-Channel profile supports a greater assortment of merchandise than the Single-Channel profile. Foundation or Market services may be locally deployed and co-located in the Device to enhance customer experience.

The Cloud Popup Store 1280 and Cloud Register 1290 deployment profiles include dynamic orchestration and requires highly available infrastructure. In some embodiments, only the Presentation Services are deployed to the device.

Market Innovation

Market extensions are supported by the SEE as discussed above. For example, a Market entity wants to introduce personalized coupons to select customers, then first an SEP Administrator configures the new Personalized Coupon orchestration, rules and events according to the Market entity's task. The new rules are added to the SEP Ruleset, "isCustomerAccountActive" rule is configured, "isBusinessMember" rule is configured, and a new event to the Event Manager configuration is defined. A Personlized Coupon orchestration is added with the following candidate services and conditions:

| Pre Conditions | Service | Post Conditions |
| --- | --- | --- |
| Customer Credentials | Authorization.getIdentityFor( ) | Customer Identity |
| Customer Identity | Customer.lookUpCustomerProfile( ) | Customer Profile |
| Customer Profile | Coupons.getCouponsFor( ) | Coupon[ ] |

Presentation Services can then invoke the an orchestration called PersonalizedCoupons that handles personalized coupons. The Orchestration Engine calls the services in the sequence specified by the configuration. Pre-conditions must be present in the Session Container before calling a service. Post-conditions are results that the Orchestration Engine puts in the Session Container upon completion of a service. The Coupon component evaluates the pertinent rules from the SEP Ruleset, and calls the Third-Party Coupon Vendor service via the Federated Messaging component, which has been configured to route the request for this service according to a vendor agreement.

Interaction Architecture Approach

Integration of service components both internally within SEE and externally with other systems, third-parties and vendors are provided by the Orchestration and Federated Messaging layers with security control and monitoring supported by the Security and Monitoring layer. The integration domain within the SEE consists of vendor products offering native and/or customized interfaces and services, and custom developed interfaces and services. The integration domain with systems and services external to SEE consists of market facing and enterprise facing interfaces and services. For both integration domains, in an example embodiment there is support for at least three integration types: Online for real-time and near real-time scenarios, Batch for bulk processing scenarios, and Offline for disconnected scenarios, such as store-and-forward and popup stores.

Any number of combinations among these integration types is provided to support various devices, environments and operational requirements under various scenarios. The sequencing and matching of pre-condition and post-condition of services in support of these integration types is handled through a combination of Orchestration and Federated Messaging components. The Federated Messaging layer is responsible for providing the linkage between primary and secondary (or more backup sites if appropriate) connections to, and invocation of, services in a manner that is transparent to service requesters. This layer also provides message transformation and broker services with its integration tools.

Online Integration

Real-time integration is coordinated by the Orchestration Engine and supported by the Federated Messaging components. Near real-time integration requires collaboration with the Event Manager as described above in the Orchestration Layer responsibilities. In any case, the Messaging layer is responsible for carrying the payload information.

An orchestration consists of one or more services executing in a predictable sequence. The control of the sequence of execution of the constituent services in an orchestration is defined using Orchestration Administration and is supported with rules. An orchestration can be invoked when an event occurs and can in turn generate additional events, supporting from the simplest service call to very complex aggregations of service calls. As discussed above, to invoke an orchestration as a result of events occurring there are two choices: subscriptions (push model) and topics (pull model). In general, when an event is triggered from an event producing service or orchestration in the Foundation, Market or Orchestration layers, the Event Manager in the Orchestration layer is responsible for persisting the event in the Event Repository, publishing the event in the appropriate topics or context groups (in support of the pull model), and notifying subscribers by invoking the configured orchestrations (in support of the push model).

Push Model

Figure 13:
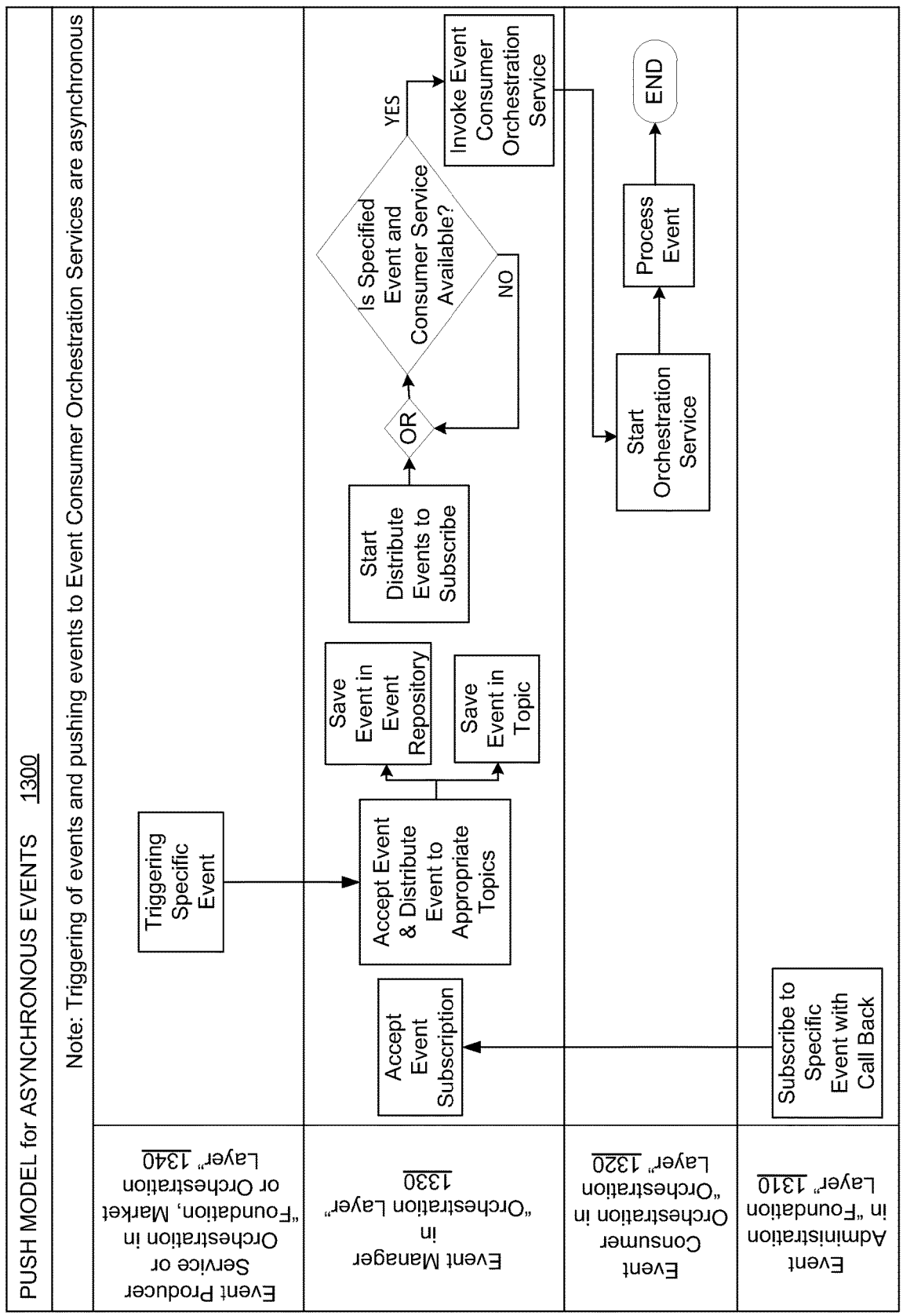
FIG. 13 is a diagram of an exemplary process illustrating example steps of a push model in a sales execution environment, according to an example embodiment.

FIG. 13 is a diagram of an exemplary process 1300 illustrating example steps of a push model, according to an example embodiment. In an example push model, an administrator using the SEP Administration services in the Foundation layer 1310 subscribes to events with call backs representing Event Consumer Orchestrations in the Orchestration layer. When the event is triggered, the Event Manager 1330 notifies subscribers and invokes corresponding available Event Consumer Orchestration Services 1320 asynchronously. The push model is useful when the triggering of an event requires immediate attention. The push model focuses on decoupling orchestrations, as in decoupling checkout from monitoring restricted items in order to detect a pattern of concern, for example. For instance, a purchase of a restricted item (for example, a meth ingredient) occurs. The 'restrictedItem' event is triggered during checkout orchestration, capturing additional event data such as which payment instrument was used to transact and by whom. The Event Manager 1330 triggers an orchestration designed to create a rule to block/warn sales of this item at local stores within a radius of certain miles, so that the customer may not buy additional quantities of the restricted item. In this example, the design intent is to balance a fast checkout experience to the shopper with the need to monitor sales of restricted items. However, the shopper does not pay a performance price while the pattern analysis components do their work.

Pull Model

Figure 14:
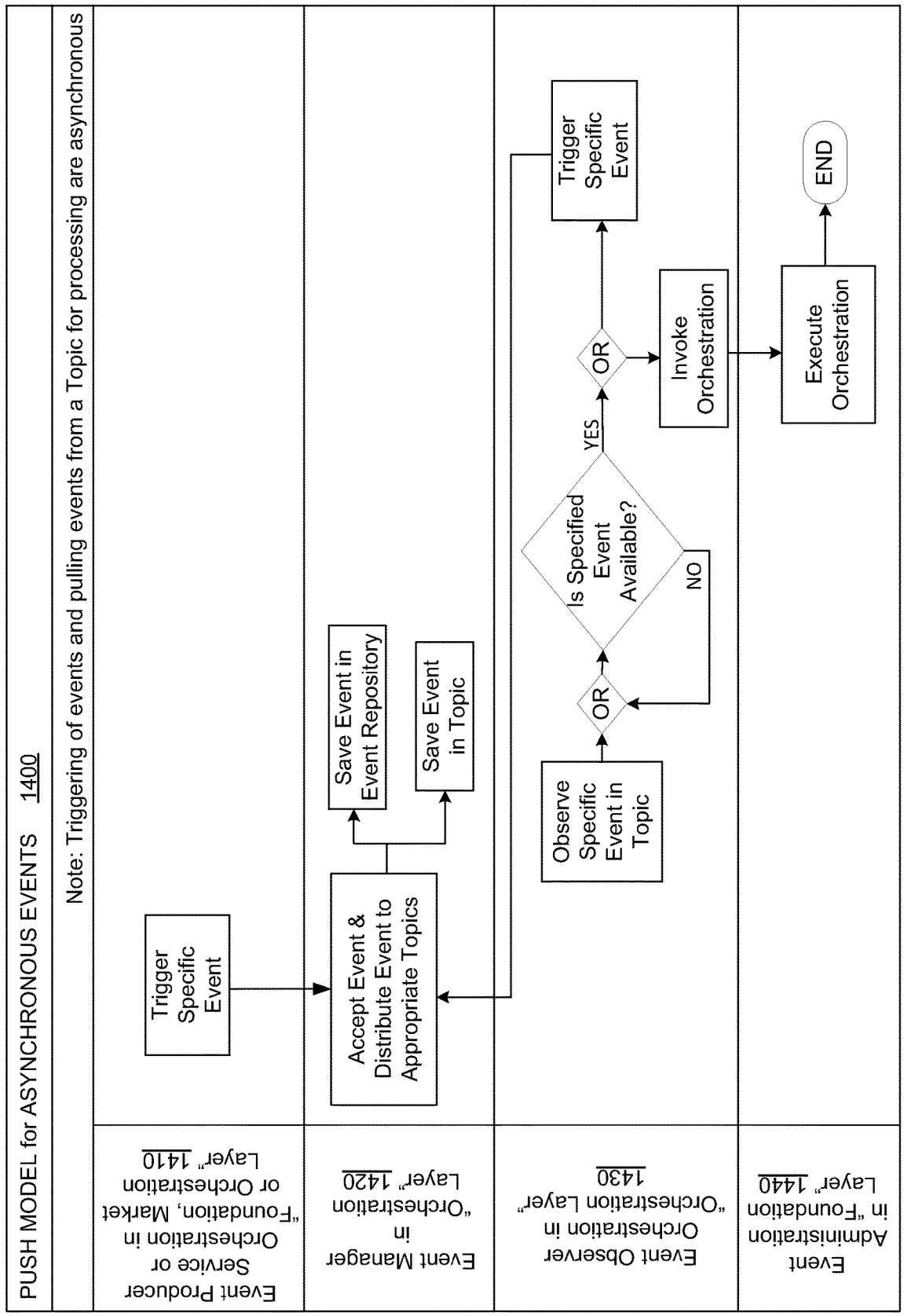
FIG. 14 is a diagram of an exemplary process illustrating example steps of a pull model in a sales execution environment, according to an example embodiment.

FIG. 14 is a diagram of process 1400 illustrating example steps of a pull model, according to an example embodiment. As in the push model, an occurrence of an event or a triggered event from an event comes from an orchestration or service in the Foundation or Market layers 1410. The event consumption is different however; the responsibility of the Event Manager 1420 ends with the publishing of events to the topic(s) or context group(s). Rather than the Event Manager 1420 invoking orchestrations as per the configuration, Event Observer 1430 in the Foundation or Market layer 1410 monitors events as they are published to the different topics. When the Event Observer 1430 sees a specific event of interest in the topic or the context group, or a pattern is detected, it may trigger additional events or invoke an orchestration in the Orchestration layer 1440. For example, a Fraud Detection Observer would monitor events in the Sales Completed topic. If a suspicious pattern is detected, it triggers a 'potentialFraud' event which in turn initiates an appropriate orchestration.

Batch Integration

The Batch mode of integration is suitable when there is a collection of events or data records to be processed by a service, and the accumulation of data records before processing is a natural business process. In certain embodiments, processing a series of data records together is an optimum way to handle a large number of records. The batch (or block) processing can be triggered by a time (schedule) event or situation (condition) event. A sequence of records can be delivered from one SEE component to another by the Federated Messaging layer. The Federated Messaging layer is responsible for sending the records in sequence or in parallel from the source location, and reassembling the records at the target location in the same sequence as they appeared in the originating source.

Offline Integration

Offline integration can be used to support offline operations of SEE supported devices and components. These devices are not limited to POS register and store mobile devices. Once the appropriate SEE components are configured and deployed on the devices or the store, under the control of the Device Manager (the component that controls interaction with a device and allows for a level of abstraction from the business logic) in the Foundation layer, each planned offline operation period is preceded with a Pre-Offline integration operation which includes installation of updates to components if available and downloading of any relevant supporting data like item and price for an ASDA Popup Store. At the completion of an offline operation period, a Post-Offline integration operation uploads any accumulated data from the offline operation onto the Store and Enterprise SEE systems which in turn updates any relevant systems external to SEE. The Pre and Post Offline integration operations are based on synchronization of the SEE components between the offline device and the Store/Enterprise systems through the Orchestration and Federated Messaging layers.

An offline device equipped with components from the Federated Messaging layer can retain information as messages to be sent when the offline device is connected back to the Store/Enterprise systems in the Post-Offline integration operation. Otherwise any information that needs to be passed back to the Store/Enterprise systems is retained in some form of storage like files or database. Also any required pre-loaded information such as a relevant subset of item and price information is stored locally. This capability is also referred to herein as store-and-forward.

In an example embodiment, a local information data service is provided so that components deployed for offline operations can be retained within a retention period. The local information data service with an internal data retention design pattern also addresses and optimizes response time and data latency requirements for online operations. Required data that is available in the local information data service and is within the data latency requirement can be retained and retrieved without going to a remote system of record in the Enterprise layer. The local information data service also determines when and what to store within defined data retention policy while updating the remote external system of record transparent to the requesting service. This local data repository in the information data service is also where pre-loaded data for offline operation can be saved.

In some embodiments, in support of unplanned offline operations, there is Pre-Offline Integration operation scheduled periodically to run at a frequency depending on the availability requirements to prepare the devices or store before any unplanned disruption occurs. This process for example can allow devices in a store to continue sales operation when connections to the store or enterprise systems are disrupted unexpectedly.

Pre-Offline Integration

Before store based offline devices go into offline operation, they need to be prepared by downloading relevant and up-to-date data, such as item and price information, from the store, enterprise and/or external third-party vendors. The data flow between the various environments may be as described here. Data from the Enterprise Systems and Services in the Enterprise Environment is downloaded through the Federated Messaging layer into the subset of Enterprise Systems and Services deployed in the Store Environment. If necessary any required data from the third-party vendors in the External Environment is downloaded into the Enterprise, Market and Foundation components in the Store Environment. Data is downloaded through the Federated Messaging layer from the Foundation components in the Store Environment into the subset of Foundation components deployed in the Devices. Data is downloaded through the Federated Messaging layer from the Market components in the Store Environment into the subset of Market components deployed in the Devices. Data is downloaded through the Federated Messaging layer from the Enterprise components in the Store Environment into the subset of Enterprise components deployed in the Devices.

Post-Offline Data Integration

Once offline devices finish their operation, they upload relevant data, such as sales transactions, stored in their local data services or messaging layer in the Devices back to the store, enterprise and/or external third-party vendors. The upload data may flow between the various environments as described here. Data is uploaded through the Federated Messaging layer from the Foundation components in the Devices into the Foundation components in the Store Environment. Data is uploaded through the Federated Messaging layer from the Market components in the Devices into the Market components in the Store Environment. Data is uploaded through the Federated Messaging layer from the Enterprise components in the Devices into the Enterprise components in the Store Environment. If necessary any required data from the Foundation, Marketing or Enterprise components in the Store Environment is uploaded into the third-party vendors in the External Environment. Data is uploaded through the Federated Messaging layer from the Enterprise components in the Store Environment into the Enterprise components in the Enterprise Environment.

Services adopting the Internal Data Retention Design Patterns, discussed above, may facilitate their offline deployment and integrations, contribute to high availability by being able to function with some functionality reduction under unplanned connectivity disruption, and enable support for optimum response time and data latency requirements.

Figure 15:
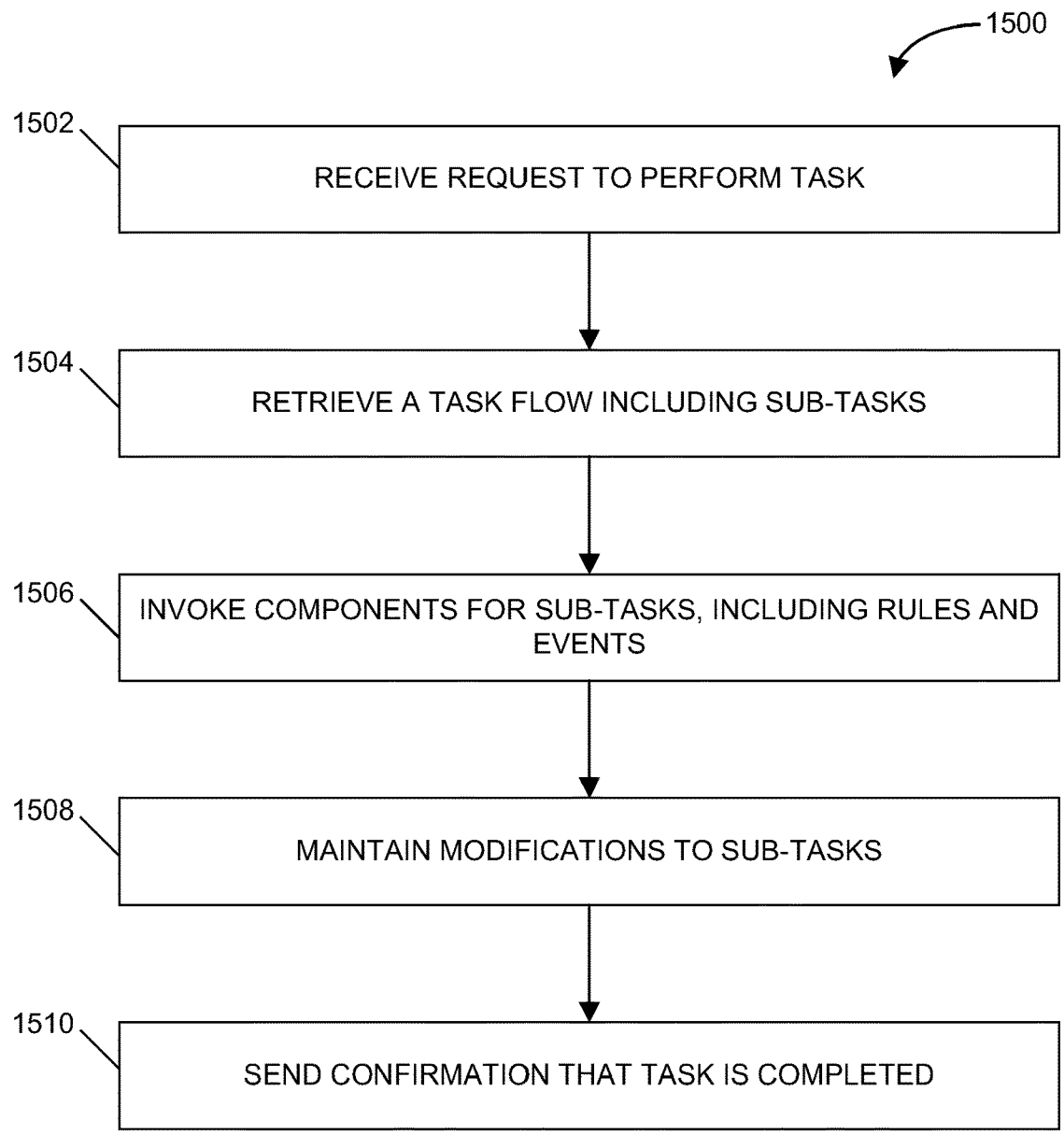
FIG. 15 is a chart of an exemplary method for facilitating execution of a task using a sales execution environment, according to an example embodiment.

FIG. 15 is a flowchart of an exemplary method 1500 for facilitating execution of a multi-step task using the SEP of the SEE, according to an example embodiment. Method 1500 starts with operation 1502 receiving a request to perform a task. The task is a commerce-related task in a commerce environment. The request may include context information related to the task, where context information is information required to perform the task, such as the task to be performed and any inputs and output required for the task. For example, the context information may include a customer name, an employee name, an item name, product serial number, and the like. This request may be sent by a device that is capable of interacting with the SEP. The device may be received by the presentation layer discussed above.

At operation 1504, a task flow, including sub-tasks is retrieved. The task flow may be referred to as an orchestration or a process. The sub-tasks may be referred to as services, candidate services, sub-orchestrations, orchestrations, sub-processes, and processes. The orchestration layer discussed may retrieve the task flow. The task flow may be retrieved based on information provided in the request. In some embodiments, the request names the task flow to be retrieved. A number of different task flows may be stored in a database, along with the sub-tasks included in the task flow. As discussed above, the processes in the SEP are made of various components to promote modularity of the system. The sub-tasks may form the various components that make up the process.

At operation 1506, components for sub-tasks are invoked, including rules and events. As discussed above, there may be rules and events associated with a task flow and/or sub-tasks. These rules and events are associated are saved as part of the task-flow and invoked as appropriate. In some embodiments, the rules and events are invoked based on a sequence in which the sub-tasks are executed. The rules may be evaluated by a rules engine that is part of the orchestration layer. The events may be triggered and executed by an event manager that is part of the foundation layer discussed above. A sub-task may have a task-flow associated with itself that dictates the tasks, rules, and events to be invoked to complete the sub-task. As an example, refer to exemplary process 1000 shown in and discussed in connection with FIG. 10.

At operation 1508, modifications to the sub-tasks are maintained. An authorized user may make modifications to a sub-task. These modifications may reflect, for example, changes in technology or changes in the market. The user may also modify rules and events associated with a task-flow. A user may also configure a new task flow that contains sub-tasks, rules, and events. The next time a task flow is invoked, the modified sub-tasks, rules and events are executed.

At operation 1510, a confirmation is sent that the task is completed. The confirmation is sent to the requesting component. In some embodiments, the orchestration layer sends a confirmation to the presentation layer. After the confirmation is received, the presentation layer may render a result of the task on the device that requested the task.

Figure 16:
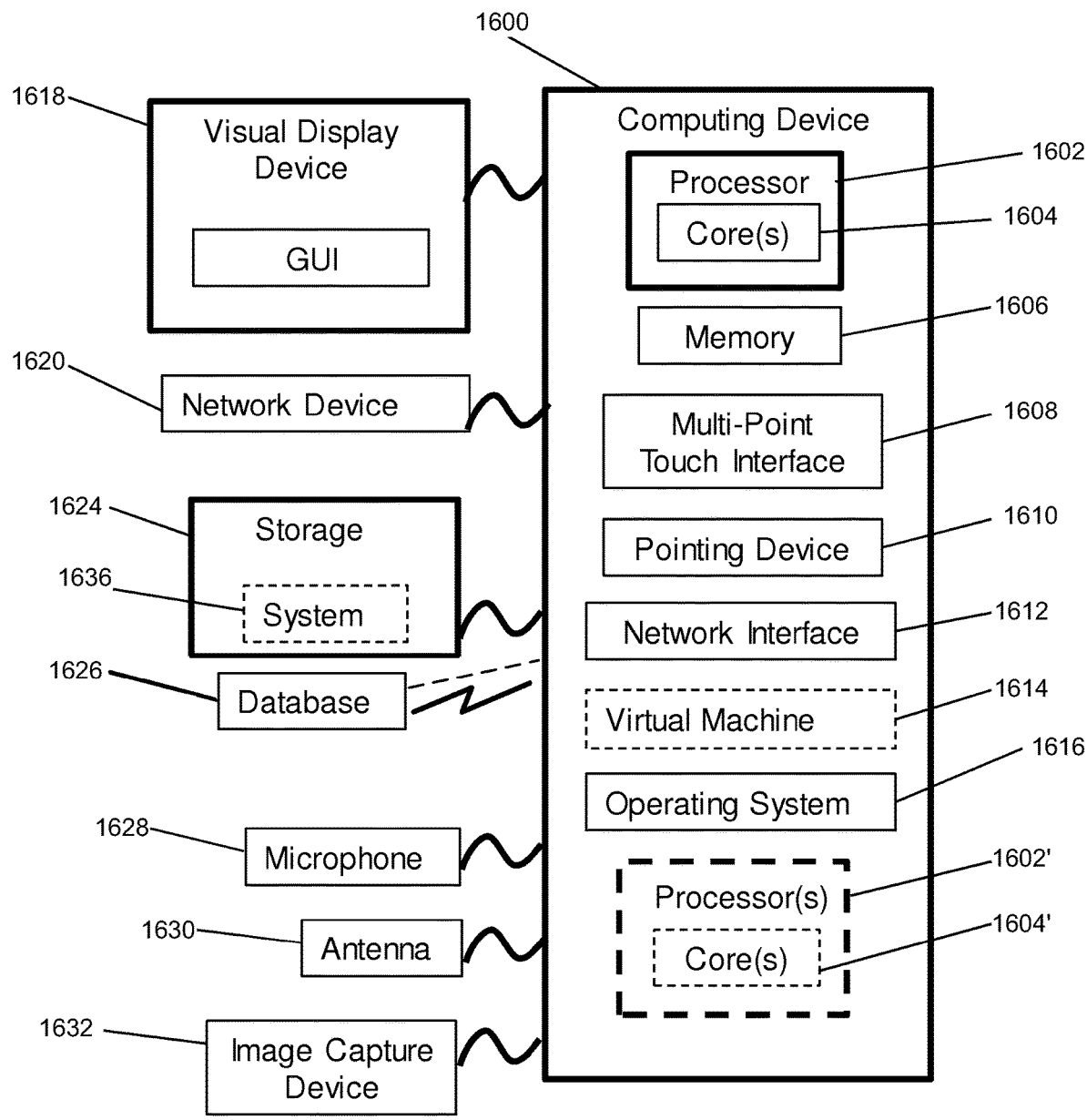
FIG. 16 is a block diagram of an exemplary computing device for implementing embodiments of the present disclosure, according to an example embodiment.

FIG. 16 is a block diagram of an exemplary computing device 1600 that may be used to implement exemplary embodiments of the SEE described herein or portions thereof. The computing device 1600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1606 included in the computing device 1600 may store computer-readable and computer-executable instructions or software for implementing exemplary embodiments of the SEE 1636. One or more computational components illustrated in FIG. 9 can be included in the SEE 1636. In some embodiments, SEE 1636 includes the "Add Items to Basket" component 901, the "Personalized Coupons" component 902, the "Total Order" component 903, the "Collect Payment" component 904, and the "Record the Sale" component 905. However, depending on the transaction, one or more components may not be invoked or called to execute the sales transaction.

The computing device 1600 also includes configurable and/or programmable processor 1602 and associated core 1604, and optionally, one or more additional configurable and/or programmable processor(s) 1602' and associated core (s) 1604' (for example, in the case of computer systems having multiple processors/cores), for executing computer-readable and computer-executable instructions or software stored in the memory 1606 and other programs for controlling system hardware. Processor 1602 and processor(s) 1602' may each be a single core processor or multiple core (1604 and 1604') processor.

Virtualization may be employed in the computing device 1600 so that infrastructure and resources in the computing device may be shared dynamically. A virtual machine 1614 may be provided to handle a process running on multiple processors so that the process appears to be using only one computing resource rather than multiple computing resources. Multiple virtual machines may also be used with one processor.

Memory 1606 may include a computer system memory or random access memory, such as DRAM, SRAM, EDO RAM, and the like. Memory 1606 may include other types of memory as well, or combinations thereof.

A user may interact with the computing device 1600 through a visual display device 1618, such as a computer monitor, which may display one or more graphical user interfaces that may be provided in accordance with exemplary embodiments. The computing device 1600 may include other I/O devices for receiving input from a user, for example, a keyboard or any suitable multi-point touch interface 1608, a pointing device 1610 (e.g., a mouse), a microphone 1628, and/or an image capturing device 1632 (e.g., a camera or scanner). The multi-point touch interface 1608 and the pointing device 1610 may be coupled to the visual display device 1618. The computing device 1600 may include other suitable conventional I/O peripherals.

The computing device 1600 may also include one or more storage devices 1624, such as a hard-drive, CD-ROM, or other computer readable media, for storing data and computer-readable instructions and/or software that implement exemplary embodiments of the SEE 1636 described herein. Exemplary storage device 1624 may also store one or more databases for storing any suitable information required to implement exemplary embodiments. For example, exemplary storage device 1624 can store one or more databases 1626 for storing information, such as product information, customer information, market information, orchestration information, actors, devices, security protocols, rules, events, services, tasks, store information, and/or any other information to be used by embodiments of the SEE 1636. The databases may be updated manually or automatically at any suitable time to add, delete, and/or update one or more items in the databases.

The computing device 1600 can include a network interface 1612 configured to interface via one or more network devices 1620 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 1600 can include one or more antennas 1630 to facilitate wireless communication (e.g., via the network interface) between the computing device 1600 and a network. The network interface 1612 may include a built-in network adapter, network interface card, PCMCIA network card, card bus network adapter, wireless network adapter, USB network adapter, modem or any other device suitable for interfacing the computing device 1600 to any type of network capable of communication and performing the operations described herein. Moreover, the computing device 1600 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 1600 may run any operating system 1616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1616 may be run in native mode or emulated mode. In an exemplary embodiment, the operating system 1616 may be run on one or more cloud machine instances.

Figure 17:
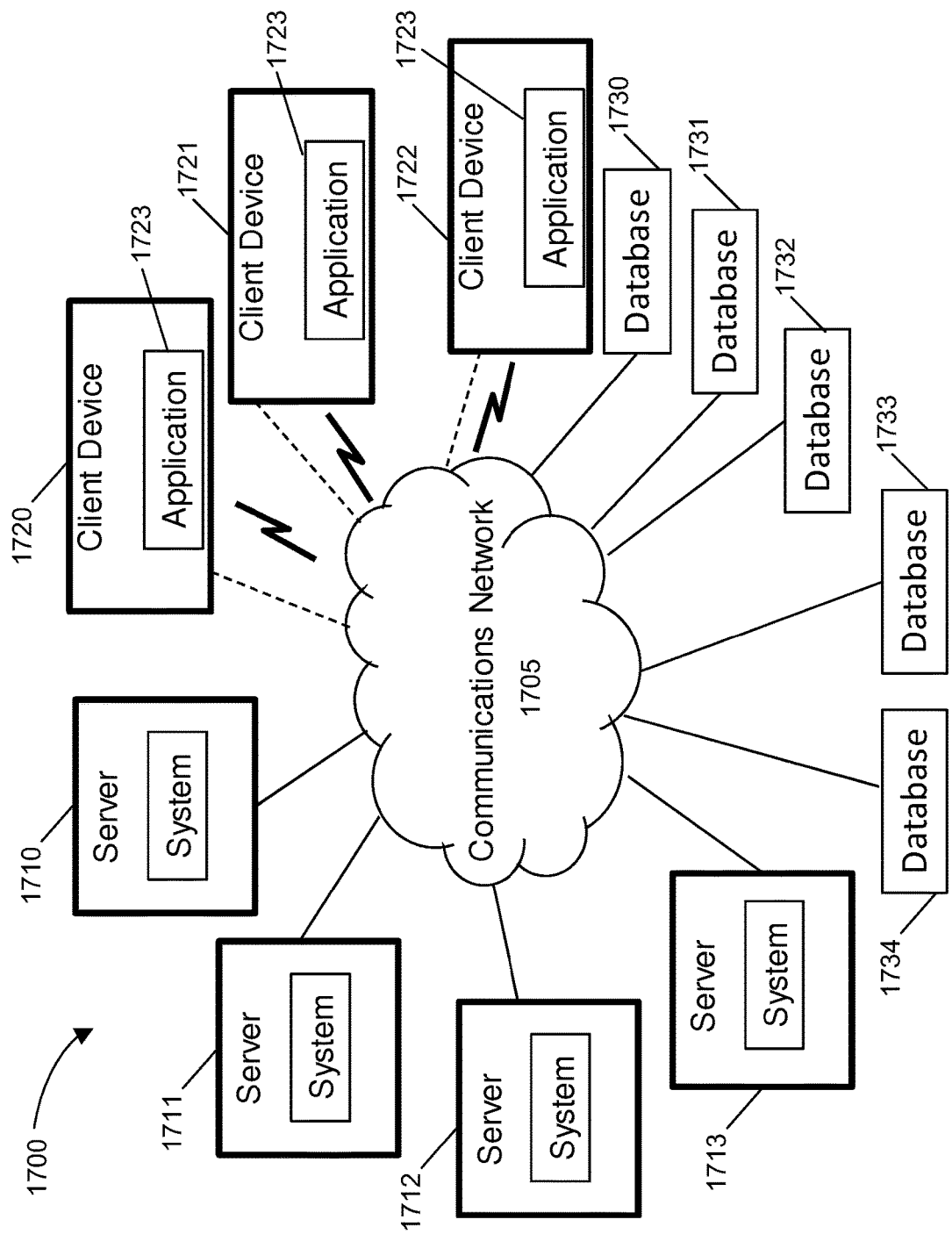
FIG. 17 is a block diagram of an exemplary client-server environment for implementing embodiments of a sales execution environment as described herein.

FIG. 17 is a block diagram of an exemplary client-server environment 1700 configured to implement one or more embodiments of the environment 100. The environment 1700 includes servers 1710-1713 operatively coupled to clients 1720-1722, via a communication network 1750, which can be any network over which information can be transmitted between devices communicatively coupled to the network. For example, the communication network 1750 can be the Internet, an Intranet, virtual private network (VPN), wide area network (WAN), local area network (LAN), and the like. The environment 1700 can include repositories or databases 1730-1734, which can be operatively coupled to the servers 1710-1713, as well as to clients 1720-1722, via the communications network 1750. The servers 1710-1713, clients 1720-1722, and databases 1730-1734 can be implemented as computing devices. Those skilled in the art shall recognize that the database devices 1730-1734 can be incorporated into one or more of the servers 1710-1713 such that one or more of the servers can include databases. In an exemplary embodiment, different portions of the SEE 1636 can be implemented by one or more of the server 1711-1713 and/or databases 1730-1734.

The client devices 1720-1722 can include a client side application 1723 programmed and/or configured to access or execute the system to facilitate a sales transaction as described herein. In the present embodiment, the client devices 1720-1722 can be computing devices including, for example, portable computing devices. In one embodiment, the client-side application 1723 implemented by the client device 1720 can be a web-browser capable of navigating to one or more web pages hosting GUIs of the SEE and the client-side application 1723 implemented by the client device 1721 can be a GUI of the SEE. For example, in some embodiments, the client-side application 1723 implemented by one or more of the client devices 1720-1722 (e.g., portable computing devices) can be an application specific to the SEE and the SEP, which is installed on the client devices 1720-1722 to permit access to a GUI(s) of the SEE or the application can be portions of the SEE itself. In some embodiments, the application specific to the SEE can be a mobile application installed and executed by a portable computing device. In exemplary embodiments, the client devices 1720-1722 can be configured to communicate with the network 1750 via wired and/or wireless communication.

The databases 1730-1734 can store information for use by the SEE and SEP. For example, the database 1730 can store information related to actors and devices capable of interacting with the SEP, the database 1731 can store information for Market and Enterprise interfaces and information communicated between the interfaces and the SEP, the database 1732 can store information related to the store systems within the SEP, the database 1733 can store information related to the architectural layers of the SEP, and the database 1734 can store information related to candidate services and components of the SEP.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art shall understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art shall recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for detecting an event in a distributed computing environment and controlling an operation of devices in the distributed computing environment based on the event, the method comprising:
receiving an event orchestration, events, and a ruleset associated with a rule data structure from a third party system, wherein the distributed computing environment is configured based on the event orchestration, the events, and the ruleset, wherein the ruleset enables a set of rules to be applied to a specific context;
receiving data at a first computing device in response to execution of a first computer process corresponding to a first multi-step commerce related task by a POS terminal, the first computing device and POS terminal communicating over a communications network, where the ruleset and events are associated with the first multi-step commerce related task, and the event orchestration invokes services in a particular sequence in support of the first multi-step commerce related task;
analyzing the received data in real time to dynamically detect occurrence of events associated with a pattern, the analysis based on event criteria for identifying patterns;
detecting the occurrence of the events associated with the pattern;
triggering the event orchestration at the first computing device to abort subsequent execution of the first multi-step commerce related task at a second computing device in response to determining that a rule of the set of rules has not been satisfied;
aborting the subsequent execution of a sub-task of the first multi-step commerce related task at the second computing device based on the event orchestration;
triggering event orchestration at the first computing device to alter the particular sequence in support of the first multi-step commerce related task without modifying the rule data structure;
executing the altered sequence in support of the first multi-step commerce related task invoking at least a subsequent sub-task at one of one or more computing devices, wherein the one or more computing devices comprises the second computing device.

2. The method of claim 1, further comprising automatically initiating execution of a second computer process corresponding to a second task based on completion of the event orchestration.

3. The method of claim 1, wherein the triggering of the event orchestration includes performing a predefined sequence of a plurality of software modules in response to the events.

4. The method of claim 3, wherein the predefined sequence of the plurality of software modules is performed asynchronously.

5. The method of claim 3, wherein the predefined sequence of the plurality of software modules is performed while the first multi-step commerce related task is being executed.

6. The method of claim 1, further comprising:
distributing the events to subscriber software modules;
determining that the subscriber software module is available; and
in response to the determining, triggering the event orchestration by the subscriber software module.

7. The method of claim 6, further comprising receiving a request from a software module to subscribe to the events, subscription allowing the software module to receive a notification of the occurrence of the events.

8. The method of claim 1, further comprising publishing the events to one or more context groups based on at least one of a type of event that occurred or a type of the first multi-step commerce related task that is executed.

9. The method of claim 8, further comprising:
observing, by a software module, for the publication of the events in a particular context group;
determining that the event criteria is satisfied; and
in response to the determining, triggering the event orchestration.

10. The method of claim 9, further comprising:
automatically initiating execution of a second computer process corresponding to a second task based on the pattern.

11. A system for detecting an event in a distributed computing environment and controlling an operation of devices in the distributed computing environment based on the event the system comprising:
a first computing device communicatively coupled over a communications network with a POS terminal and a one or more other computing devices,
wherein the first computing device is configured to:
receive an event orchestration, events, and a ruleset associated with a rule data structure from a third party system, wherein the distributed computing environment is configured based on the event orchestration, the events, and the ruleset, wherein the ruleset enables a set of rules to be applied to a specific context;
receive data in response to execution of a first computer process corresponding to a first multi-step commerce related task by the POS terminal, where the ruleset and events are associated with the first multi-step commerce related task, and the event orchestration invokes services in a particular sequence in support of the first multi-step commerce related task,
analyze the received data in real time to dynamically detect occurrence of events associated with a pattern, the analysis based on event criteria for identifying patterns,
detecting the occurrence of the events associated with the pattern,
trigger the event orchestration at the first computing device to abort subsequent execution of the first multi-step commerce related task at a second computing device, of the one or more other computing devices, in response to determining that a rule of the set of rules has not been satisfied,
abort the subsequent execution of a sub-task of the first multi-step commerce related task at the second computing device based on the event orchestration,
trigger event orchestration at the first computing device to alter the particular sequence in support of the first multi-step commerce related task without modifying the rule data structure, and
execute the altered sequence in support of the first multi-step commerce related task invoking at least a subsequent sub-task at one of one or more other computing devices.

12. The system of claim 11, wherein the first computing device is configured to automatically initiate execution of a second computer process corresponding to a second task based on completion of the event orchestration.

13. The system of claim 11, wherein triggering of the event orchestration by the first computing device includes performing a predefined sequence of a plurality of software modules in response to the events.

14. The system of claim 13, wherein the predefined sequence of the plurality of software modules is performed asynchronously.

15. The system of claim 13, wherein the predefined sequence of the plurality of software modules is performed while the first multi-step commerce related task is being executed.

16. A non-transitory computer-readable storage device configured to store instructions executable by a processing device, wherein execution of the instructions causes the processing device to implement a method for detecting an event in a distributed computing environment and controlling an operation of devices in the distributed computing environment based on the event, the method comprising:

receiving an event orchestration, events, and a ruleset associated with a rule data structure from a third party system, wherein the distributed computing environment is configured based on the event orchestration, the events, and the ruleset, wherein the ruleset enables a set of rules to be applied to a specific context;

receiving data at a first computing device in response to execution of a first computer process corresponding to a first multi-step commerce related task by a POS terminal, the first computing device and the POS terminal communicating over a communications network, where the ruleset and events are associated with the first multi-step commerce related task, and the event orchestration invokes services in a particular sequence in support of the first multi-step commerce related task;

analyzing the received data to dynamically detect occurrence of events associated with a pattern, the analysis based on event criteria for identifying patterns;

detecting the occurrence of the events associated with the pattern;

triggering the event orchestration at the first computing device to abort subsequent execution of a sub-task of the first multi-step commerce related task at a second computing device in response to determining that a rule of the set of rules has not been satisfied;

aborting the subsequent execution of the first multi-step commerce related task at the second computing device based on the event orchestration;

triggering event orchestration at the first computing device to alter the particular sequence in support of the first multi-step commerce related task without modifying the rule data structure; and executing the altered sequence in support of the first multi-step commerce related task invoking at least a subsequent sub-task at one of one or more computing devices, wherein the one or more computing devices comprises the second computing device.

17. The non-transitory storage device of claim 16, wherein the method further comprises automatically initiating execution of a second computer process corresponding to a second task based on completion of the event orchestration.

18. The non-transitory storage device of claim 16, wherein the triggering of the event orchestration includes performing a predefined sequence of a plurality of software modules in response to the events.

19. The non-transitory storage device of claim 18, wherein the predefined sequence of the plurality of software modules is performed asynchronously.

20. The non-transitory storage device of claim 18, wherein the predefined sequence of the plurality of software modules is performed while the first multi-step commerce related task is being executed.

* * * * *

UNITED STATES PATENT AND TRADEMARK OFFICE
CERTIFICATE OF CORRECTION

| | |
|---|---|
| PATENT NO. | : 11,410,104 B2 |
| APPLICATION NO. | : 15/106658 |
| DATED | : August 9, 2022 |
| INVENTOR(S) | : Jason Todd et al. |

It is certified that error appears in the above-identified patent and that said Letters Patent is hereby corrected as shown below:

On the Title Page

Column 2, in the ABSTRACT, at Line 3, insert a --.-- following the word "environment" and prior to "In response".

In the Claims

In Claim 11, at Column 42, Line 22, delete "and a" and replace with --and--.

Signed and Sealed this
Sixth Day of December, 2022

Katherine Kelly Vidal
*Director of the United States Patent and Trademark Office*